(12) United States Patent
Delhoume et al.

(10) Patent No.: US 12,200,454 B2
(45) Date of Patent: Jan. 14, 2025

(54) METHODS AND DEVICES FOR REJOINING A GROUP

(71) Applicant: Sonos, Inc., Santa Barbara, CA (US)

(72) Inventors: Alexia Delhoume, Santa Barbara, CA (US); Sara Lincoln, Alexandria, NH (US); Brian Roberts, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 107 days.

(21) Appl. No.: 17/855,321

(22) Filed: Jun. 30, 2022

(65) Prior Publication Data
US 2023/0007397 A1 Jan. 5, 2023

Related U.S. Application Data

(60) Provisional application No. 63/217,744, filed on Jul. 1, 2021.

(51) Int. Cl.
| | |
|---|---|
| H04R 29/00 | (2006.01) |
| G06F 3/16 | (2006.01) |
| H04R 3/12 | (2006.01) |
| H04R 27/00 | (2006.01) |
| H02J 7/00 | (2006.01) |

(52) U.S. Cl.
CPC ............... *H04R 3/12* (2013.01); *G06F 3/162* (2013.01); *G06F 3/165* (2013.01); *H04R 27/00* (2013.01); *H04R 29/002* (2013.01); *H02J 7/0048* (2020.01); *H04R 2227/005* (2013.01)

(58) Field of Classification Search
CPC ........ H04R 3/12; H04R 27/00; H04R 29/002; H04R 2227/005; G06F 3/162; G06F 3/165; H02L 7/0048

USPC .......................................................... 381/1, 59
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — William J Deane, Jr.

(57) ABSTRACT

A method of determining whether a first playback device is to rejoin a group is disclosed. The method comprises playing back, by the first playback device, media content in synchrony with at least a second playback device, wherein the first and second playback devices are playing back the media content as members of a group. While playing back the media content, and after a loss of power at the first playback device, the method comprises stopping, by the first playback device, playback of the media content. After the loss of power, and after a resumption of power to the first playback device the method comprises automatically determining to rejoin the group and joining the first playback device to the group.

20 Claims, 18 Drawing Sheets

(56) References Cited

U.S. PATENT DOCUMENTS

| | | | |
|---|---|---|---|
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0336499 | A1* | 12/2013 | Beckhardt ............ H04R 29/007 381/81 |
| 2014/0169569 | A1* | 6/2014 | Toivanen ................ H04R 5/04 381/17 |
| 2015/0075680 | A1* | 3/2015 | Tanaka ..................... C21D 1/26 148/333 |
| 2015/0377545 | A1* | 12/2015 | Freitag ................... B29C 65/72 264/249 |
| 2016/0246348 | A1* | 8/2016 | Ambapuram ........... G06F 1/329 |
| 2022/0256281 | A1* | 8/2022 | Marash ................. H04R 1/406 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

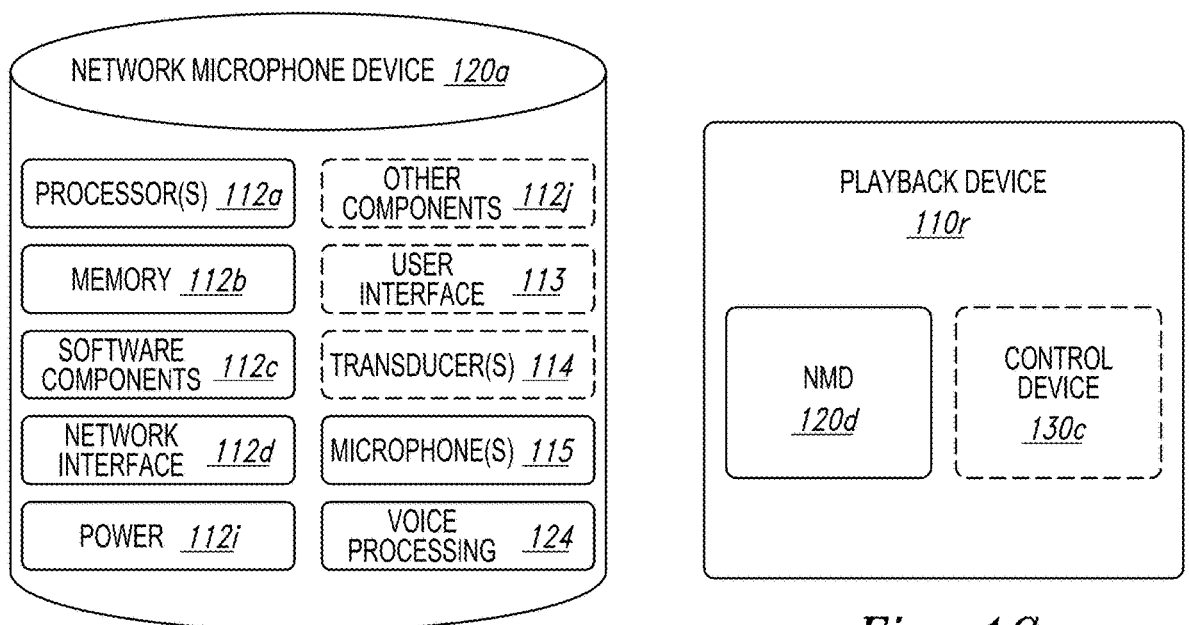
*Fig. 1F*
*Fig. 1G*
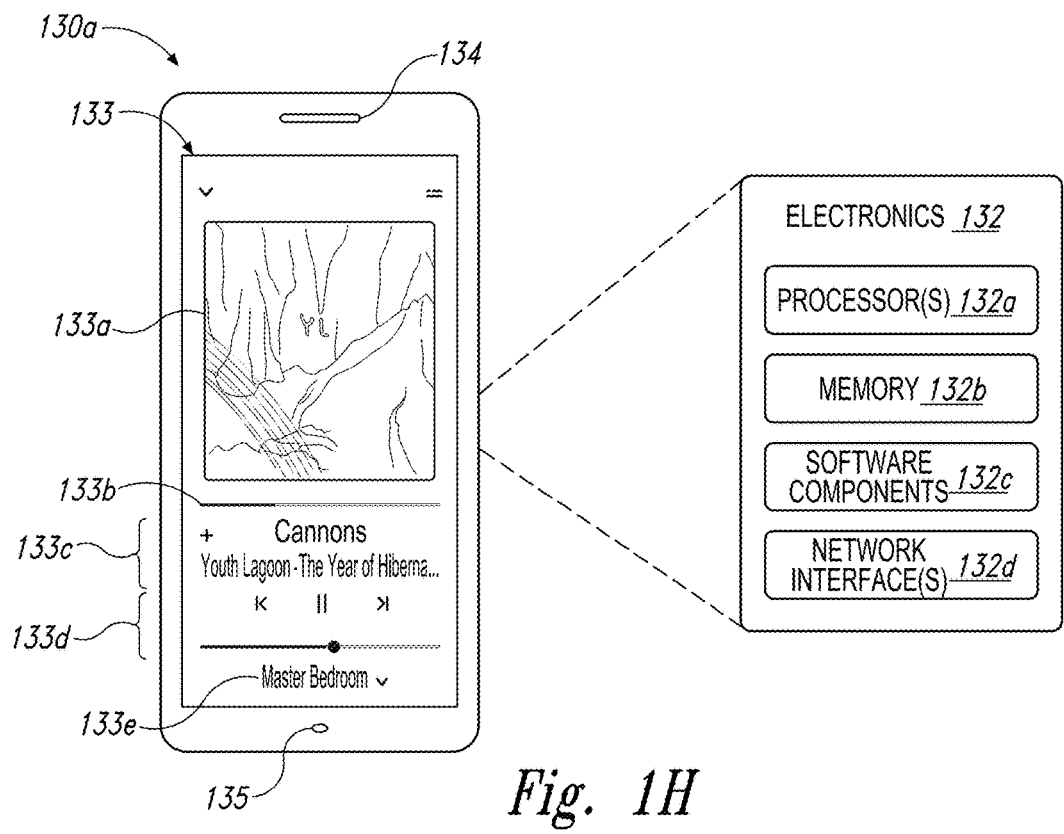
*Fig. 1H*

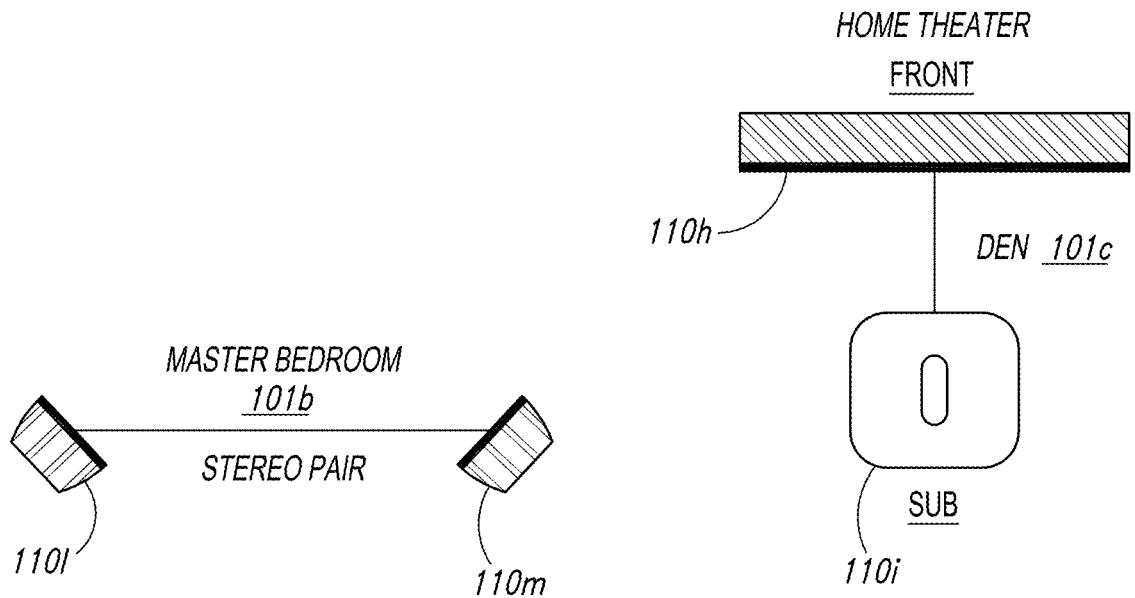
Fig. 1I
Fig. 1J
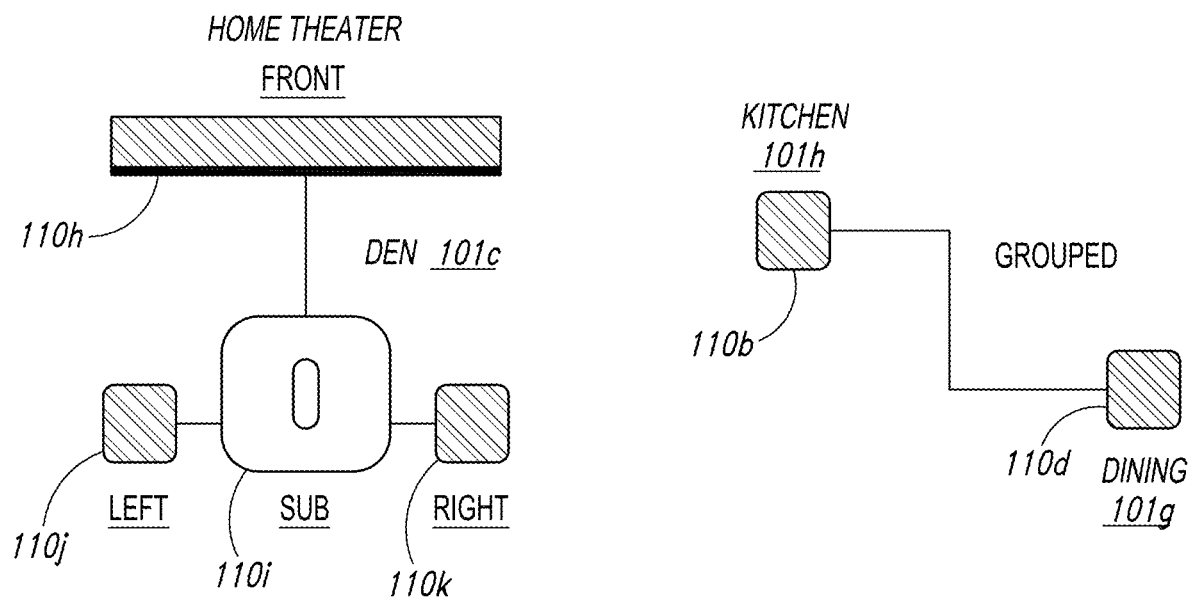
Fig. 1K
Fig. 1L

US 12,200,454 B2

METHODS AND DEVICES FOR REJOINING A GROUP

CROSS-REFERENCE TO RELATED APPLICATIONS

This application claims the benefit of priority under 35 U.S.C. § 119 to U.S. Provisional Patent App. No. 63/217,744, titled "Methods and Devices for Rejoining a Group" and filed on Jul. 1, 2021, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1I through 1L are schematic diagrams of corresponding media playback system zones.

Figure 1A:
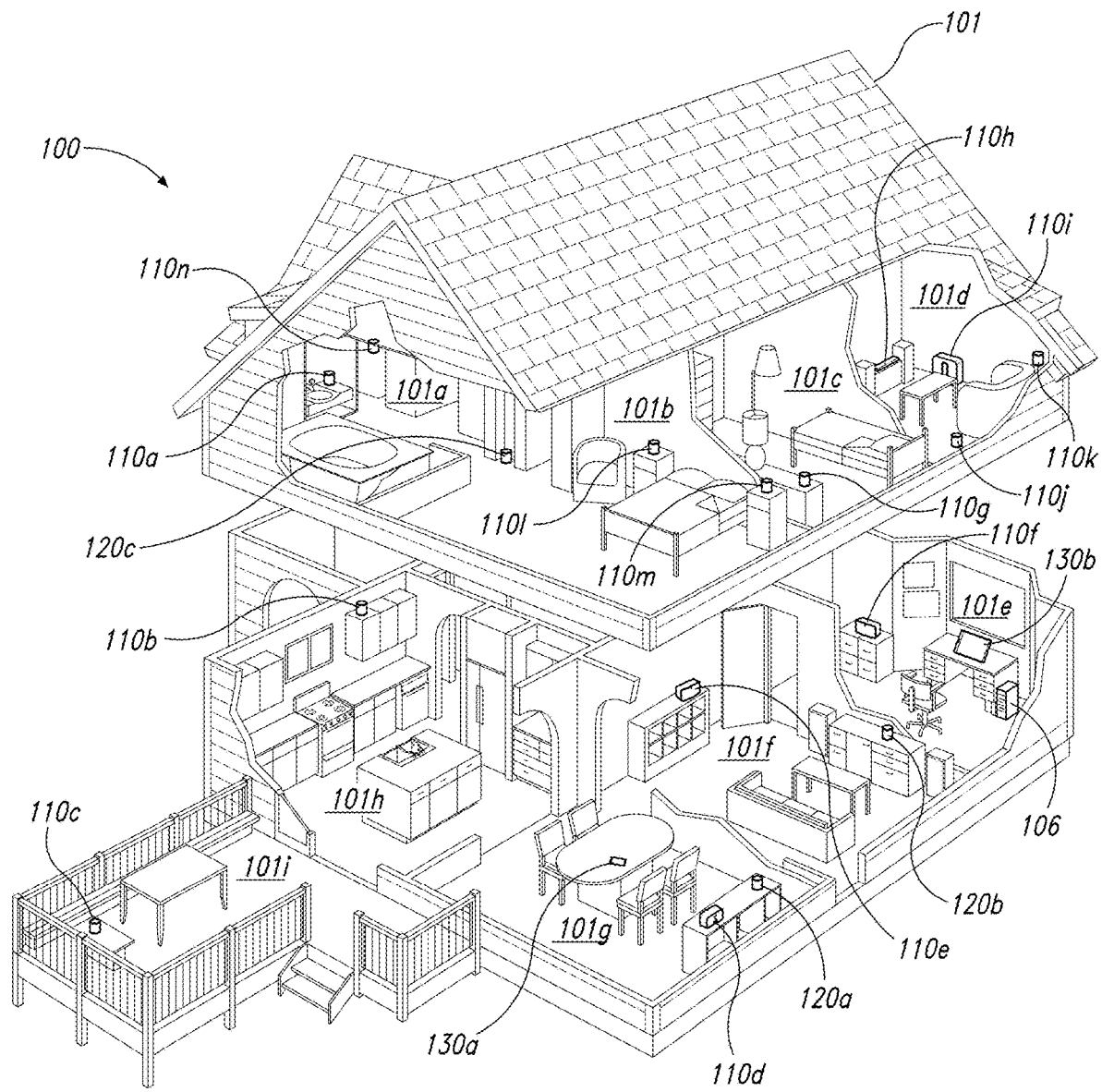
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to methods of determining whether a playback device is to rejoin a previous group of playback devices after experiencing a loss of power and a subsequent resumption of power. A playback device may experience a loss of power either because an internal power source, such as a battery, has run out of power or because a user has operated a button or switch that controls the application of power to the playback device, for example. The loss of power can result in the playback device disconnecting from a current group, and therefore stopping playback of media content. In certain circumstances, the loss of power may not have been intended, for example, the switch may control a secondary device associated with the playback device, such as a light. After operating the switch and inadvertently causing the playback device to turn off, the user may operate the switch again to turn the playback device back on. Based on certain criteria, such as the length of time the playback device was switched off, it may be automatically determined that the playback device is to rejoin the group when power is resumed. Rejoining the group means that the playback device can continue playing back media content with other members of the group. In some circumstances, the loss of power may have been intended, and so upon resumption of power, it may be determined that the playback device is not to rejoin the group. Accordingly, methods herein describe different rules and criteria used to assess whether the playback device is to rejoin the group. This decision process can, in some examples, attempt to determine user intent (i.e., determine whether the loss of power was intended) and take appropriate action without requiring the user to intervene. The methods described herein therefore provide a more efficient process of regrouping a playback device after a loss of power.

In some embodiments, a method comprises: playing back, by a first playback device, media content in synchrony with at least a second playback device, where the first and second playback devices are playing back the media content as members of a group. While playing back the media content, and after a loss of power at the first playback device, the method further comprises stopping, by the first playback device, playback of the media content. After the loss of power, and after a resumption of power to the first playback device, the method further comprises automatically determining to rejoin the group and joining the first playback device to the group. The remaining members of the group, such as at least the second playback device, can continue to play back the media content after the loss of power.

In some examples, the method further comprises, after the loss of power, the first playback device leaving the group. In some examples, the first playback device comprises, or can access, at least two sources of power, such as a battery and an external power source. In those examples, a loss of power may mean a loss of just one source of power. Similarly, a resumption of power may mean a resumption of just one source of power.

In some examples, the method comprises steps of automatically determining whether to rejoin the group, and if it is determined to rejoin the group, joining/adding the first playback device to the group, and if it is determined not to rejoin the group, not joining/adding the first playback device to the group. Not joining/adding the first playback device to the group may comprise awaiting, by the first playback device, a command to play back media content.

In one example, the loss of power occurs after an operation of a button or switch, the button or switch being remote from the first playback device, and the resumption of power occurs after a subsequent operation of the button or switch. Accordingly, a user may operate a button or switch that is separate from the first playback device, where the operation causes a loss or resumption of power. The button or switch may be known as a "power switch", because it controls the application of power to the first playback device. The button or switch may also control the application of power to another device, such as an illumination device (i.e., a light) associated with the first playback device. In a particular example, the first playback device and the illumination device form part of a single entity, such as a ceiling speaker. The button or switch is therefore also remote (or separate) from the ceiling speaker. In some examples, where the button or switch has a dual functionality, in that it controls the application of power to the first playback device and another device, such as the illumination device, a user may inadvertently power off the first playback device, while intending to only power off the other device.

In some examples, such as when the first playback device comprises (or is powered by) a battery, the playback device may detect an input to the button or switch, and then cause the loss or resumption of power by turning off/on a power supply to the first playback device.

A separate or remote button or switch that controls the application of power may be useful if the first playback device is located out of reach of the user, such as when the device is attached to a ceiling or a light fitting.

In some examples, the first playback device comprises a battery and the loss of power at the first playback device occurs when the battery is depleted. The first playback device may be a portable playback device that is powered by a battery when it is not coupled to an external power source. When the battery is depleted (i.e., is substantially "empty"), the first playback device may turn off and stop playback of the media content. The loss of power is therefore a loss of power from the battery.

Similarly, in some examples, the resumption of power to the first playback device occurs when the first playback device is connected to an external power source. An external power source may be a source of AC power, such as mains electricity or utility power. The external power source is a source of power that is external to the first playback device (and the ceiling speaker, in examples where the first playback device forms part of a ceiling speaker).

As briefly mentioned above, in some examples, automatically determining to rejoin the group comprises automatically determining to rejoin the group based on a time period between the loss of power and the resumption of power. For example, if the interruption of power occurs for a "short" time period (such as less than 5 minutes, 4 minutes, 3 minutes, 2 minutes, 1 minute, 30 seconds, 10 seconds, 5 seconds, etc.), it may be inferred that the loss of power occurred "accidentally" or against a user's intention, and therefore the user is likely to want the first playback device to rejoin the group once power has resumed. This method may therefore comprise determining to rejoin the group if the time period is less than a threshold time period.

In some examples the time period is based on the type of playback device (or another device characteristic). For example, if the first playback device is a portable playback device, the time period may be longer than the time period for a playback device that is part of a ceiling speaker. The longer time period for a portable playback device is because it can allow a user longer to connect the playback device to an external power source, whereas a ceiling speaker may always be coupled to an external power source, and the shorter time period is because a user may need only to operate the button or switch again to resume power.

The time period may be determined by a device separate to the first playback device, such as a networked device. Networked devices include other members of the group playing back media content (such as the second playback device), other playback devices in the playback system, control devices, or computing devices in the cloud. Accordingly, in some examples, the method comprises determining, by a networked device, a time period between the loss of power and the resumption of power. Various methods of determining when the loss and resumption of power occur by the networked device are described later in this document. In a particular example, the networked device determines when the loss of power and resumption of power occur based on a loss/resumption of connectivity with the first playback device. Such a method may therefore comprise determining a time period between the loss of power and the resumption of power, by: after the loss of power and before the resumption of power: determining, by a networked device, a loss of connectivity with the first playback device and storing, by the networked device, a first timestamp associated with the loss of connectivity; and after the resumption of power: determining, by the networked device, a resumption of connectivity with the first playback device and storing, by the networked device, a second timestamp associated with the resumption of connectivity, wherein the time period is a time difference between the first and second timestamps.

In some examples, the networked device transmits, to the first playback device, the time period and the first playback device determines whether to rejoin the group based on the time period. In an alternative example, the networked device determines whether the first playback device is to rejoin based on the time period, and transmits, to the first playback device, data indicating whether or not the first playback device is to rejoin.

The time period may be determined by the first playback device itself. Accordingly, the method may further comprise determining, by the first playback device, a time period between the loss of power and the resumption of power. The first playback device may be able to detect when the loss/resumption of power occurs in instances where it detects input to the button or switch, such as where the button or switch provides a control signal rather than itself disconnecting power, and/or where the first playback device has a battery to provide power the playback device even after a loss of another source of power.

In a particular example, the method comprises determining a time period between the loss of power and the resumption of power, by: in after the loss of power and before the resumption of power: detecting, by the first playback device, the loss of power, and storing a first timestamp associated with the loss of power; and after the resumption of power: detecting, by the first playback device, the resumption of power, and storing a second timestamp associated with the resumption of power, wherein the time period is a time difference between the first and second timestamps.

In another example, the method comprises determining a time period between the loss of power and the resumption of power, by: before the loss of power: detecting, by the first playback device, a first input to a button or switch indicating to power off the first playback device, and responsively storing a first timestamp associated with the loss of power; and before the resumption of power: detecting, by the first playback device, a second input to the button or switch indicating to power on the first playback device, and responsively storing a second timestamp, wherein the time period is a time difference between the first and second timestamps.

The period of time and/or one or more associated timestamps and/or the threshold may be stored as one or more state variables by the first playback device and/or a networked device.

In some examples, the decision as to whether the first playback device is to rejoin the group is based on a state of charge of the battery. The method may comprise, before the loss of power, monitoring a state of charge of the battery and storing a current state of charge; wherein automatically determining to rejoin the group comprises: determining to rejoin the group based on the current state of charge being less than a threshold. Accordingly, if the battery is determined to have been less than a threshold (i.e., the battery is "low" or depleted) before the loss of power, it may be assumed that the loss of power was due to a depleted battery, and therefore was against a user's intention. The user may therefore be likely to want the first playback device to rejoin the group. Thus, upon resumption of power, the first playback device can check the state of charge of the battery prior to the loss of power (e.g., by reading the stored current state of charge) and determine whether it was below a certain threshold, such as below 5% of full battery capacity. The state of charge of the battery may be stored as one or more state variables by the first playback device and/or a networked device.

In some examples, the monitoring and storing steps are performed by the first playback device. In another example, the monitoring and storing steps are performed by a networked device. In that case, the method may further comprise: before the loss of power, transmitting, by the first playback device to a networked device, the current state of charge of the battery. By receiving the current state of charge from the first playback device, the networked device is effectively monitoring the state of charge of the battery, this is true if the networked device receives and stores only one value or receives and stores a plurality of values. The current state of charge may be transmitted back to the first playback device after the resumption of power so that the first playback device can determine whether to rejoin the group, alternatively the networked device may determine whether the first playback device should rejoin the group and transmit a corresponding command or data to the first playback device.

In this example, the state of charge of the battery before loss of power is used to determine whether the loss of power was due to a depleted or low battery. However, in some examples, the state of charge of the battery after the resumption of power may be used to determine whether to rejoin the group. This is because the battery may still be below a threshold even after the resumption of power (i.e., even after being plugged in to an external power source). Accordingly, the method may instead comprise: after the resumption of power: determining a current state of charge of the battery and determining to rejoin the group based on the current state of charge being less than a threshold. For example, the threshold may be 5% of full battery capacity.

In some examples, the decision as to whether the first playback device is to rejoin the group is based on one or more configuration states. Configuration states may include, for example, a device condition, a device identifier, a device property or characteristic, or members of the group prior to the loss of power and/or after the resumption of power. Accordingly, automatically determining to rejoin the group comprises: storing a configuration state of the first playback device and determining to rejoin the group based on the configuration state of the first playback device. As one example, a configuration state may indicate that the first playback device is a portable playback device, such as a SONOS MOVE playback device, and a set of rules (or a look up table) indicate that if the configuration state corresponds to a portable playback device, the playback device is to rejoin the group. As another example, a first configuration state may indicate members of the group prior to the loss of power and a second configuration state may indicate members of the group after the resumption of power. Upon resumption of power, if the first configuration state corresponds to the second configuration state (i.e., the members of the group have not changed), it is determined to rejoin the group. Accordingly, in some examples, the configuration state changes over time and, in other examples, the configuration state remains constant over time. The decision as to whether the first playback device is to rejoin the group may be based on a determination that the configuration state corresponds to a particular configuration state. Alternatively, the decision to rejoin may be based on a comparison of a first and second configuration state.

As with the time period and the state of charge of the battery, the configuration state(s) may be monitored by the first playback device itself, or by a networked device. The configuration state(s) can be transmitted by the first playback device to a networked device and vice versa.

As mentioned, in some examples, the first playback device comprises a battery and is further electrically couplable to an external power source. Accordingly, the loss of power at the first playback device comprises loss of power from the external power source and the resumption of the power comprises resumption of power from the external power source. The method comprises: prior to the loss of power, powering the first playback device by the external power source; in response to the loss of power: powering the first playback device by the battery; and after the resumption of power: powering the first playback device by the external power source.

Accordingly, in some examples, the first playback device comprises a battery and is coupled to an external power source. When there is a loss of power from the external power source (because a user operated a switch, for example), the playback device may continue to run on battery power. This can allow the playback device to perform other operations, such as informing the other members of the group that it has left the group or is about to leave the group.

In some examples, where the playback device comprises a battery, the method further comprises after the loss of power: powering the first playback device by the battery for a predetermined period of time; and automatically determining to rejoin the group comprises determining that the first playback device is being powered by the battery. Accordingly, in some examples, the battery may only power the first playback device for a certain length of time, such as less than 5 minutes. If, before expiry of this period of time, there is a resumption of power, it may be determined that the playback device is to rejoin the group. The fact that the first playback device is being powered by the battery may serve as an indicator that a short period of time has passed since the loss of power from the external power source. During this predetermined period of time, the device may be operating in a standby mode, and after the predetermined period of time, the device may be operating in an offline mode.

In some examples, the method comprises, after the loss of power: outputting, by the first playback device, an audible alert. The audible alert serves to notify a user that the first playback device has experienced a loss of power and is no longer a member of the group (or is about to leave the group). In some examples, the first playback device may comprise a battery to enable the audible alert to be output even after the loss of power. The audible alert may be output by a speaker/transducer of the first playback device. In another example, one of the other members of the group additionally or alternatively output an audible alert in response to the loss of power at the first playback device.

The method may further comprise, after joining the first playback device to the group: determining, by the first playback device, that the members of the group are currently playing back media content and responsively playing back, by the first playback device, the media content in synchrony with at least the second playback device. Accordingly, as the first playback device rejoins the group, the device determines that the other members are still playing back media content. In some examples, however, after joining the first playback device to the group the method comprises determining, by the first playback device, that the members of the group are not currently playing back media content. In that case, the first playback device may await a command or instruction to play back media content.

In another embodiment, a playback device comprises: an interface configured to receive media content for playback, a speaker for reproducing the audio content, a storage, a power supply and a processing system. The storage comprises non-transitory computer-readable instructions that, when executed by the processing system, instruct the playback device to: play back, via the speaker, the media content in synchrony with at least a second playback device, wherein the playback device and the second playback devices are playing back the media content as members of a group; and while playing back the media content, and after a loss of power from the power supply: stop playback of the media content. The instructions further instruct the playback device to, after the loss of power, and after a resumption of power from the power supply: automatically determine to rejoin the group and join the playback device to the group.

In some examples, the power supply comprises a battery and the loss of power at the playback device occurs when the battery is depleted.

In some examples, the instructions, when executed by the processing system, further instruct the playback device to automatically determine to rejoin the group based on a time period between the loss of power and the resumption of power.

In some examples, the instructions, when executed by the processing system, further instruct the playback device to: before the loss of power, monitor a state of charge of the battery and store, in the storage, a current state of charge; and automatically determine to rejoin the group based on the current state of charge being less than a threshold.

In some examples, the instructions, when executed by the processing system, further instruct the playback device to: store, in the storage, a current configuration state of the playback device; and determine to rejoin the group based on the current configuration state of the playback device.

In some examples, the power supply comprises a battery and an interface to couple the playback device to an external power source, wherein the loss of power at the playback device comprises a loss of power from the external power source and wherein the resumption of the power comprises a resumption of power from the external power source, wherein the instructions, when executed by the processing system, further instruct the playback device to: prior to the loss of power, power the playback device by the external power source; after the loss of power: power the playback device by the battery; and after the resumption of power: power the playback device by the external power source.

In a particular example, the playback device is a ceiling speaker. In other words, the playback device forms at least part of the ceiling speaker.

In some examples, the ceiling speaker further comprises an illumination device. The instructions, when executed by the processing system, may instruct the illumination device to: prior to the loss of power, emit visible light from the illumination device; after a loss of power: cease to emit visible light from the illumination device; and after the loss of power, and after a resumption of power: emit visible light from the illumination device. The loss/resumption of power may therefore also cause a loss/resumption of power to the illumination device.

In some examples, the instructions, when executed by the processing system, further instruct the playback device to output, using the speaker, an audible alert after the loss of power.

In another embodiment, there is a playback device comprising: an interface configured to receive media content for playback, a speaker for reproducing the audio content, a storage, a power supply and a processing system. The storage comprises computer-readable instructions that, when executed by the processing system, instruct the playback device to perform any of the method steps described above or herein.

In another embodiment, there is provided a non-transitory computer-readable medium having computer program instructions embodied thereon, wherein the computer program instructions, when executed by a processing system of a playback device, instruct the playback device to: play back media content in synchrony with at least a second playback device, wherein the playback device and the second playback devices are playing back the media content as members of a group; while playing back the media content, and after a loss of power at the playback device: stop playback of the media content; and after the loss of power, and after a resumption of power to the playback device: automatically determine to rejoin the group and join the playback device to the group.

In another embodiment, there is a system comprising: a playback device as described above or herein; and a separate button or switch coupled to the playback device and configured to selectively control the application of power to the playback device from the power source.

In some examples, the button or switch is configurable between a first state and a second state, wherein: in the first state, power is not supplied to the playback device from the external power source; and in the second state, power is supplied to the playback device from the external power source. Transitioning from the second state to the first state (in response to user input, for example) causes a loss of power at the first playback device and transitioning from the first state to the second state causes a resumption of power at to first playback device. For example, the button or switch may be coupled into a power supply circuit for the playback device, such as a mains supply circuit for a light-fitting to which the playback device is fitted. In other examples, the button or switch may be a remote control for the playback device sending control signals to cause the playback device to power on or power off.

In another embodiment, there is provided a method of recovering a first playback device from a loss of power, the method comprising: after a loss of power, and in response to a resumption of power to the first playback device: automatically determining to rejoin a group and joining the first playback device to the group, wherein as a member of the group, the first playback device is configured to play back media content in synchrony with at least a second playback device.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Throughout the examples described herein, actions described as happening "after" a particular event may be carried out responsive to that event.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100. For example, a user can interact with a control device to cause or instruct a playback device to play back audio.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
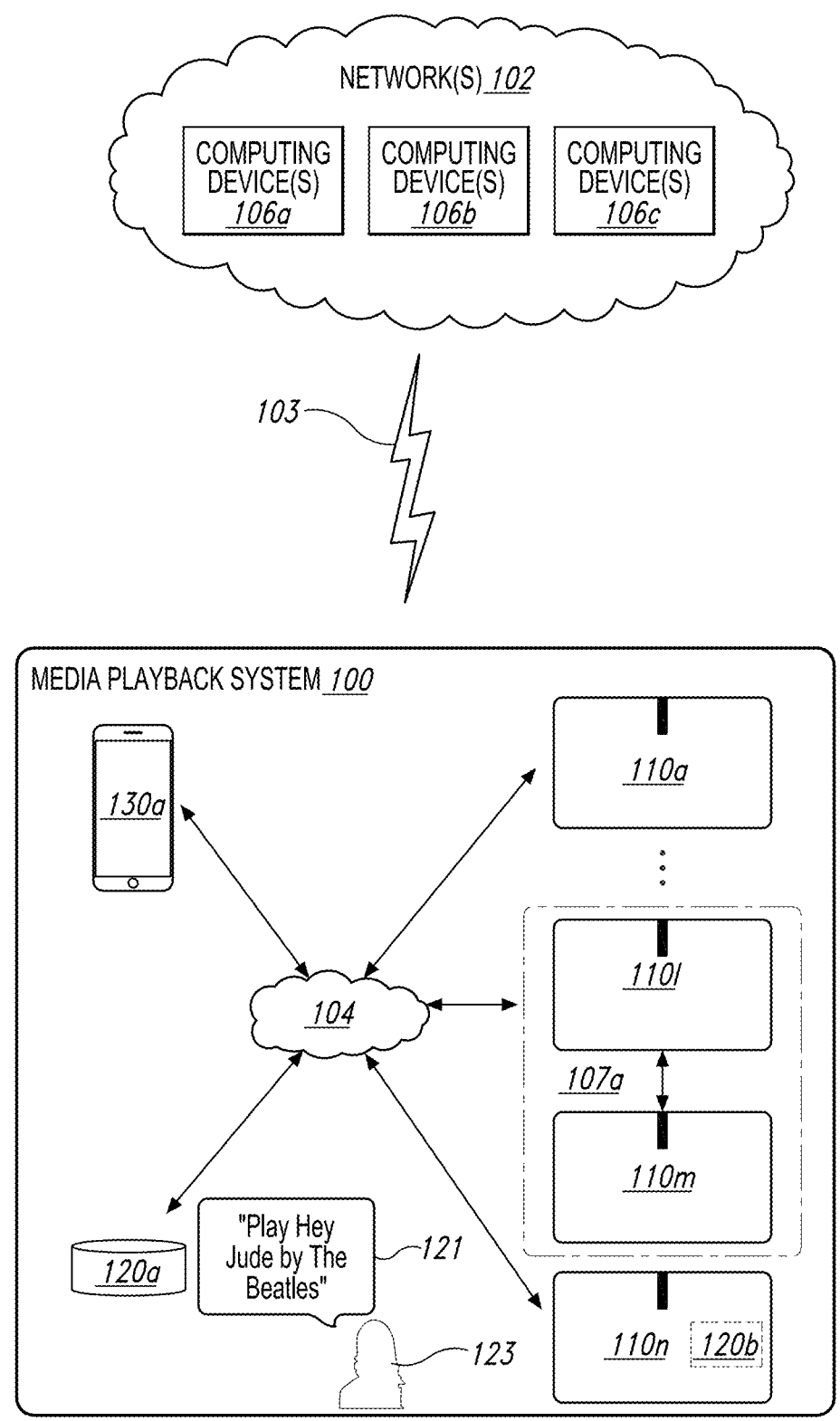
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more) than three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1I through 1M.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
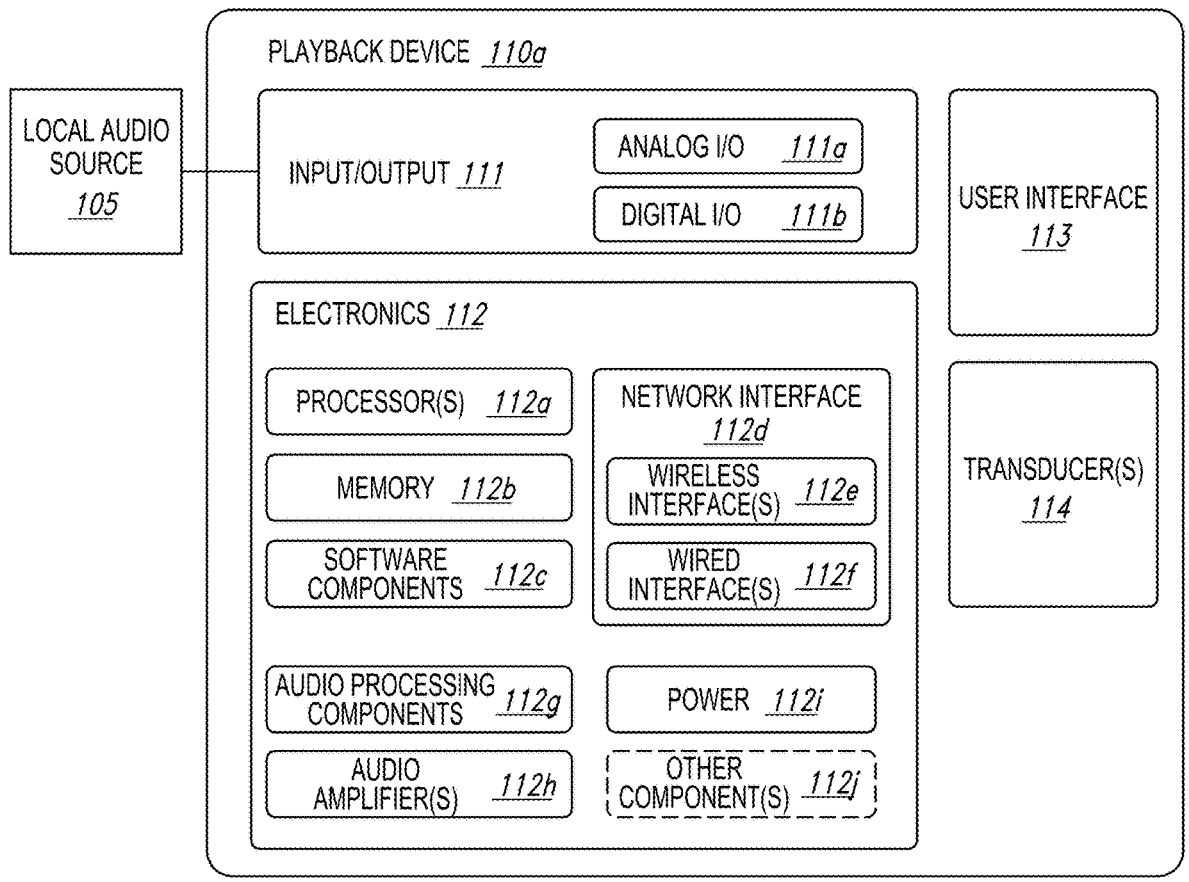
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above. The one or more processors 112a may also be referred to as a processing system.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render, play back, or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
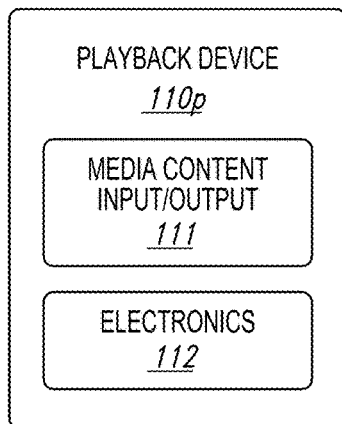
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
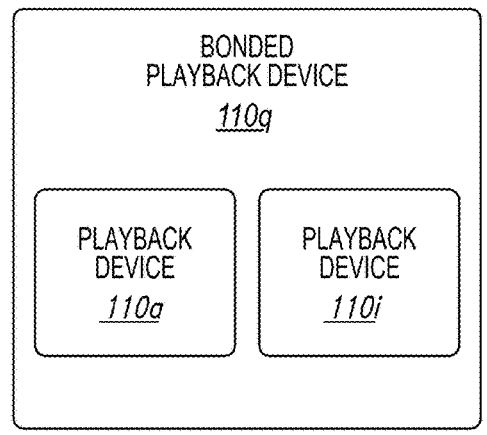
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1M:
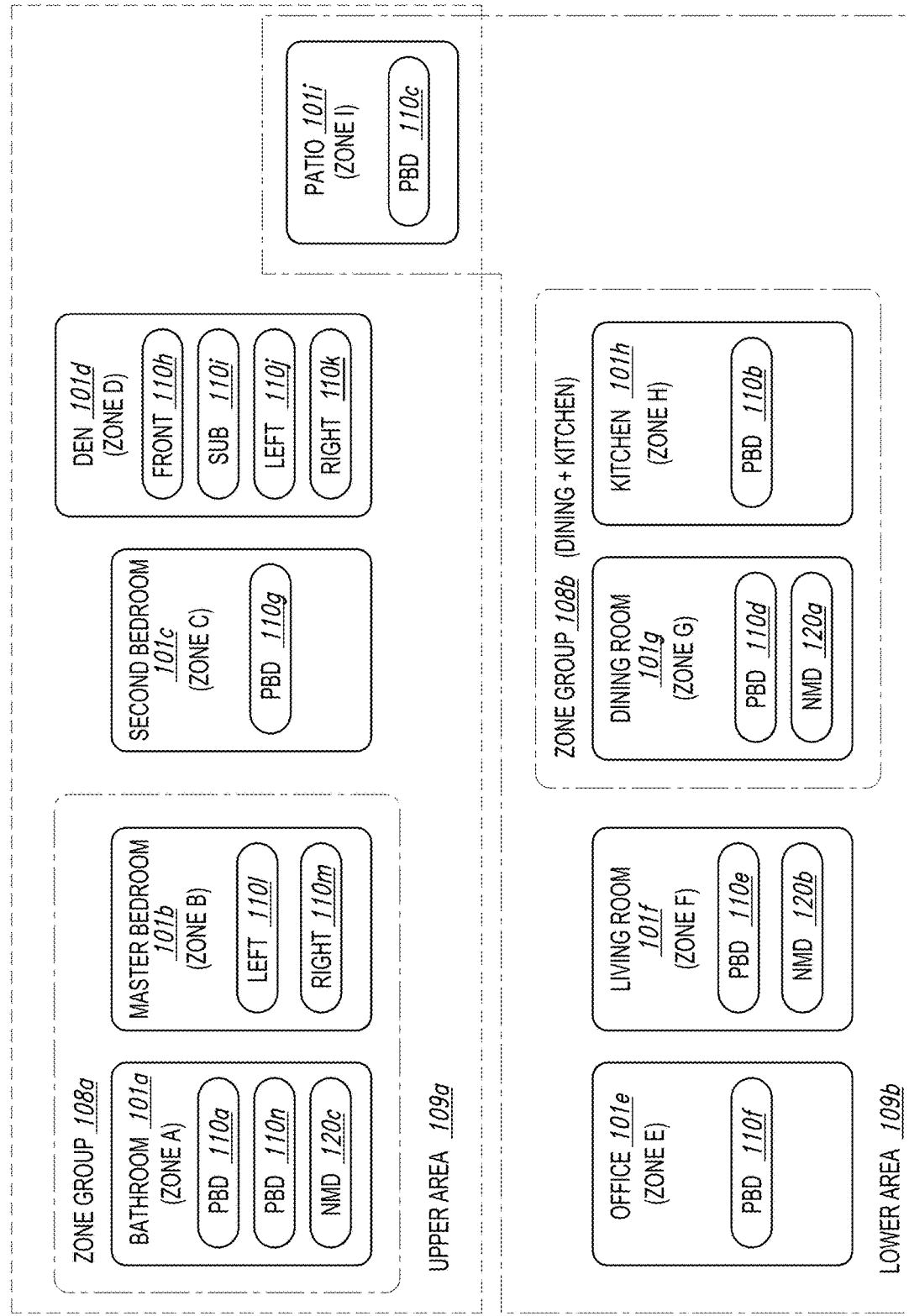
FIG. 1M is a schematic diagram of media playback system areas.

FIGS. 1I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110a and 110n can be merged to form a merged group or a zone group 108b. The merged playback devices 110a and 110n may not be specifically assigned different playback responsibilities. That is, the merged playback devices 110a and 110n may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1I, the playback devices 110l and 110m may be bonded so as to produce or enhance a stereo effect of audio content. In this example, the playback device 110l may be configured to play a left channel audio component, while the playback device 110m may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Methods and Devices for Rejoining a Group

Ceiling Speaker

Figure 2:
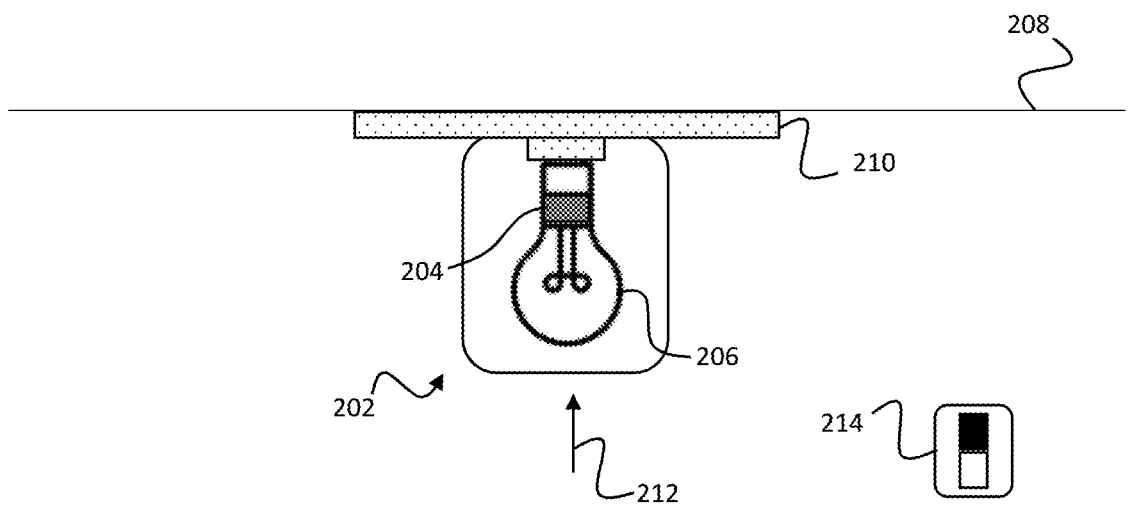
FIG. 2 is a cross sectional view of a ceiling speaker.

FIG. 2 is a diagrammatic representation of a cross sectional view of a ceiling speaker 202 comprising a playback device 204. The ceiling speaker 202 can be in the form of a combined light 206 or lighting element and speaker that can be screwed in or attached to an existing socket (e.g., E26, E27, A15, etc.). As another example, the ceiling speaker 202 can be fixed to a ceiling 208 or a wall via a fastener, such as a screw or mounting plate, may be mounted within a cavity of the ceiling 208 itself, or may be mounted to an existing light fitting (such as a bayonet, screw or pin fitting). In this example, the ceiling speaker 202 further comprises an illumination device 206, such as a light. The ceiling speaker 202 therefore has dual functionality—to output audio via the playback device 204, and to illuminate a room or location via the illumination device 206.

The ceiling speaker 202 can have a speaker grille 204 (which forms part of the playback device 204) and a light or lighting element 206 (which forms part of the illumination device 206). Both the speaker grille 204 and light 206 are connected to a main body 210 (e.g., socket or mounting surface for fixing to a wall or ceiling) of the ceiling speaker 202. The main body 210 can house any components of the playback device 204 (which includes any or all of the components described in FIG. 1C, 1D, 1F or 1G), and the illumination device 206. For example, the components (e.g., transducers, electronics 112) of the playback device 204 may be housed together or separately. It will be appreciated that in other examples, the speaker grille 204 and light 206 may take different forms and/or be arranged differently. The ceiling speaker 202 may also be referred to as a ceiling unit or speaker unit or light unit or ceiling light, in certain examples.

FIG. 2 also depicts a button or switch 214, separate to (i.e., arranged remote from) the ceiling speaker 202. The button or switch 214 (referred to hereinafter as a "switch" for brevity) is electrically and/or communicatively coupled to the ceiling speaker 202 (and therefore also to the playback device 204 and the illumination device 206). The switch 214 may comprise one or more buttons, knobs, dials, touch-sensitive surfaces, displays, or touchscreens, for example, and may be mounted on or attached to a surface (e.g., wall or counter).

A user can provide an input to the switch 214, to selectively control the application of power to the ceiling speaker 202 from a power source, such as mains power or another an external power source. Accordingly, a user can operate the switch 214 to turn on and off the ceiling speaker 202 (and therefore the playback device 204 and illumination device 206). For example, if the switch is in a first state (such as being arranged in an "off" position), power is not supplied to the playback device 204 or the illumination device 206. In that case, media content may not be played back by the playback device 204 and light may not be emitted from the illumination device 206. User input can cause the switch to change to a second state. In this second state (such as being arranged in an "on" position), power is supplied to the playback device 204 and the illumination device 206. In that case, media content may be played back by the playback device 204 and light may be emitted from the illumination device 206. Switch 214 may therefore be a bistable device.

In some implementations, the switch 214 may be a wireless or remote device that is configured to communicate and control an external power source via a network. As yet another example, a remote device in addition to or instead of the switch 214 can be used to control the external power source and/or other functionality (e.g., music playback).

As will be explained in more detail below, the ceiling speaker 202 may comprise a battery, as well as being connected/connectable to an external power source. In such examples, the switch 214 selectively controls the application of power from the external power source. Thus, when the switch 214 is in the first (OFF) state, certain components of the ceiling speaker 202, such as the playback device 204, may still be powered by the battery, at least temporarily.

Figure 3:
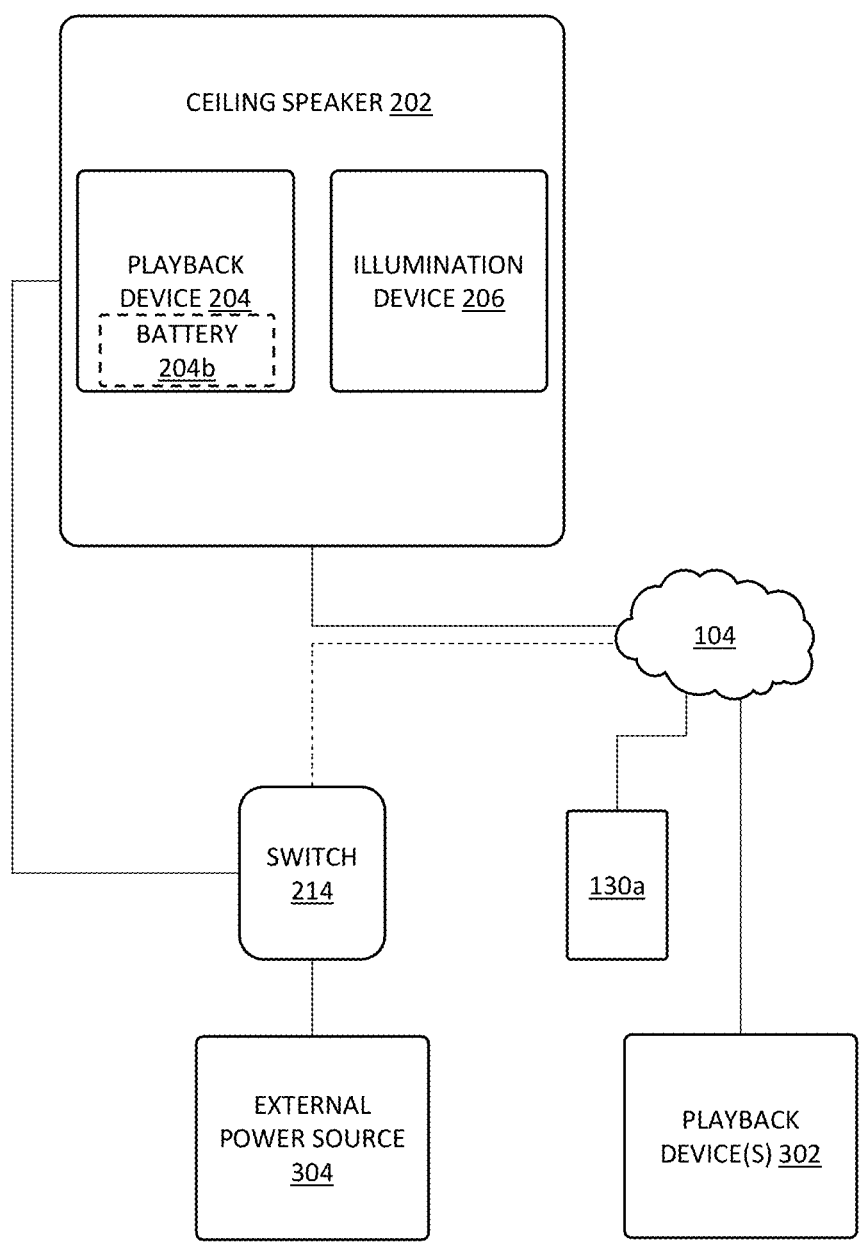
FIG. 3 is a schematic diagram of a portion of a media playback system according to a first example.

FIG. 3 is a schematic diagram of at least a portion of a media playback system 300, comprising the ceiling speaker 202, the switch 214, a network 104, a control device 130a, and one or more additional playback devices. In the present example, the one or more additional playback devices comprise a second playback device 302.

FIG. 3 additionally shows an external power source 304, such as mains electricity (utility power) electrically coupled to the ceiling speaker 202. In FIG. 3, the external power source 304 is coupled to the ceiling speaker 202 via the switch 214. For example, one or more electrical wires are physically connected to the switch 214. As shown, one or more further electrical wires are physically connected between the switch 214 and the ceiling speaker 202. In this way, power can flow from the external power source 304 to the ceiling speaker 202 via the switch 214. Operation of the switch 214 can interrupt the flow of power from the external power source 304 to the ceiling speaker 202, which in turn causes a loss of power at the ceiling speaker 202, and therefore the playback device 204 and illumination device 206.

As briefly mentioned, in some examples, the ceiling speaker 202 further comprises an internal power source, such as a battery 204b. In this example, the battery 204b is depicted as being part of the playback device 204, however, in other examples, the battery 204b may be arranged anywhere within the ceiling speaker 202. In some arrangements, the ceiling speaker 202 may not comprise an internal power source and may instead be powered solely by the external power source 304.

In certain examples, the battery 204b acts as a backup or redundant power source, should there be a loss of power from the external power source 304. In some examples, the ceiling speaker 202 may be simultaneously powered by the battery 204b and the external power source 304. In arrangements where the ceiling speaker 202 comprises a battery 204b, operation of the switch 214 can therefore still cause a loss of power at the ceiling speaker 202 by causing a loss of power from the external power source 304. The battery 204b may have a capacity sufficient to sustain power usage of ceiling speaker 202 for a few minutes (e.g., 5 minutes) after loss of power to enable the ceiling speaker 202 to shut itself down.

The ceiling speaker 202 may further comprise a network interface to facilitate the transmission of data between the ceiling speaker 202 and one or more other devices on the data network 104. The network interface may be part of the ceiling speaker 202, and/or may be integrated with the playback device 204 and/or illumination device 206. As described previously, a network interface is configured to transmit and receive data corresponding to media content and other signals. The network interface may provide a wired and/or a wireless transmission of data.

In some examples, the switch 214 also comprises a network interface to facilitate the transmission of data between the switch 214 and one or more other devices on the data network 104. FIG. 3 shows a communication link (shown with a dashed line) between the switch 214 and network 104. Data may therefore be transmitted between the switch 214 and ceiling speaker 202 indirectly via the network 104. However, in other examples, data may additionally or alternatively be transmitted directly between the switch 214 and ceiling speaker 202. The network interface may provide a wired and/or a wireless transmission of data.

Figure 4:
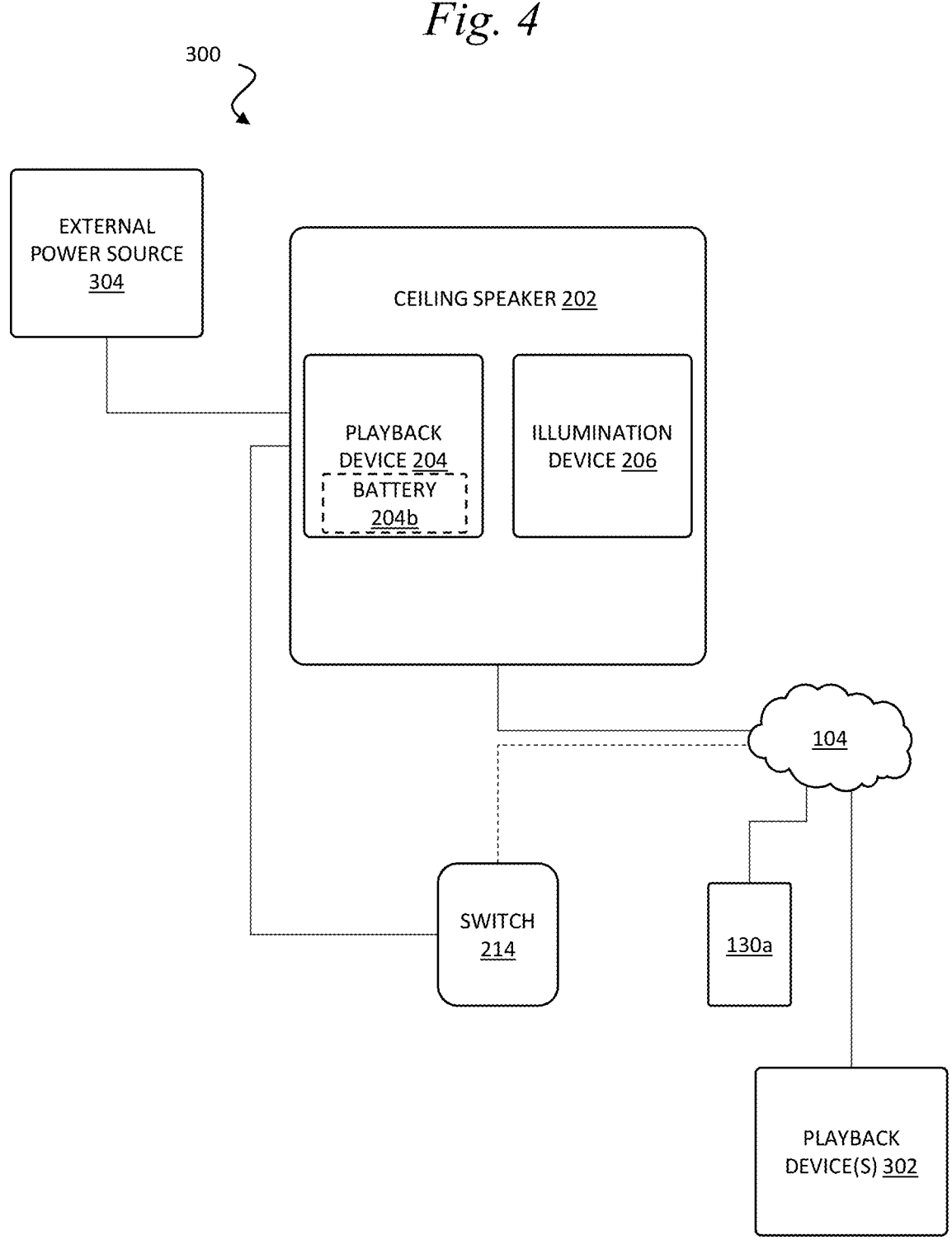
FIG. 4 is a schematic diagram of a portion of a media playback system according to a second example.

FIG. 4 is a schematic diagram of an alternative arrangement of the media playback system 300 of FIG. 3. In contrast to FIG. 3, the external power source 304 of this example is directly coupled to the ceiling speaker 202, rather than being coupled via the switch 214. Accordingly, one or more electrical wires are physically connected between the external power source 304 and the ceiling speaker 202.

FIG. 4 also shows the switch 214 coupled to the ceiling speaker 202. In a first example, the switch 214 is physically coupled via one or more electrical wires. In this first example arrangement, operation of the switch 214 causes an interruption in the flow of power from the external power source 304 to the ceiling speaker 202 by breaking an electrical connection within the ceiling speaker 202 itself. In a second example, the switch 214 comprises a network interface to facilitate the transmission of data between the switch 214 and the ceiling speaker 202. Data may be transmitted via wired or wireless means between the switch 214 and ceiling speaker 202 via the network 104 or may additionally or alternatively be transmitted directly between the switch 214 and ceiling speaker 202. In this second example arrangement, operation of the switch 214 causes a data signal to be transmitted to a network interface of the ceiling speaker which causes a component of the ceiling speaker 202 to interrupt the flow of power from the external power source 304 to the ceiling speaker 202 by breaking an electrical connection within the ceiling speaker 202. Suitable components include relays and solid-state switches.

Accordingly, in the example of FIG. 3 and in the first example of FIG. 4, operation of the switch 214 causes a direct interruption of power, whereas in the second example of FIG. 4, operation of the switch 214 causes an indirect interruption of power, via the transmission of data which causes the ceiling speaker 202 to disconnect from power.

In the examples of FIGS. 2-4, the playback device 204 of the ceiling speaker 202 can be grouped with other playback devices in the playback system 300. For example, as described in FIGS. 1A-1M, a group may be formed comprising the playback device 204 and at least a second playback device 302. When arranged in the group, the playback devices 204, 302 can be configured to play back the same media content in synchrony, from an audio content source. Playback devices within a group may be referred to as "members" of the group.

Figure 5A:
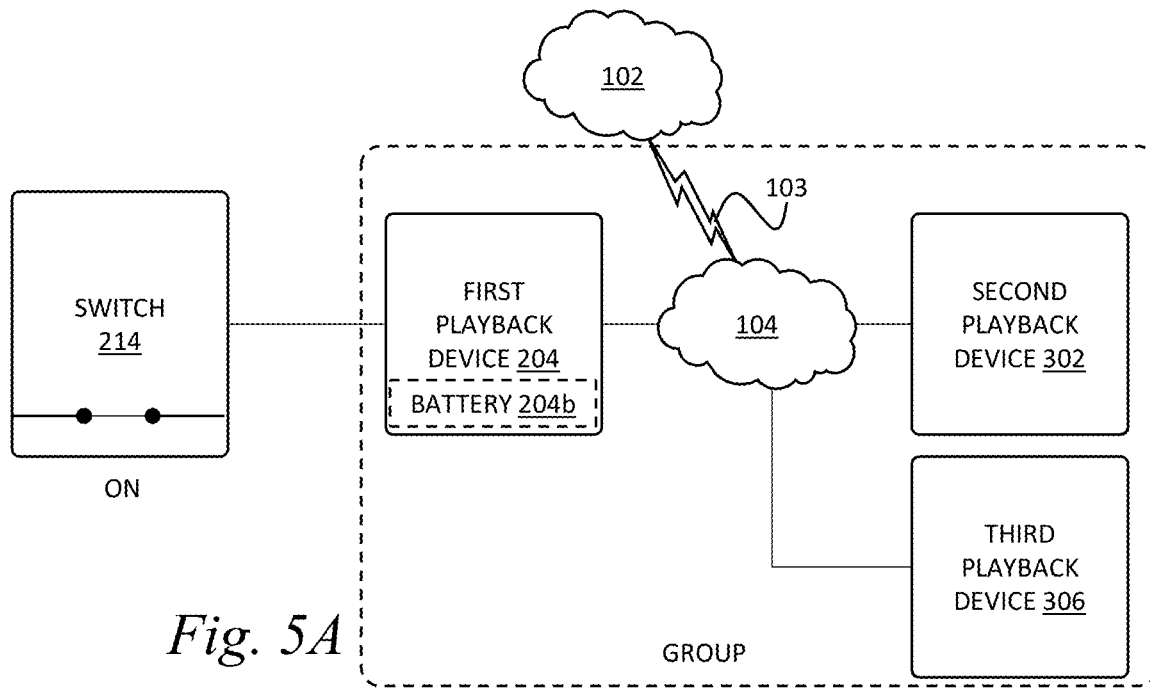
FIG. 5A is a schematic diagram of a portion of a media playback system at a first time.

FIG. 5A depicts at least part of a playback system comprising a group of playback devices. In this example, the group comprises the playback device 204, a second playback device 302 and a third playback device 306. Here, the playback device 204 is referred to as a first playback device 204. The dashed line surrounding the playback devices 204, 302, 306 illustrates members of the group. As such, at this moment in time, the first, second and third playback devices 204, 302, 306 are all members of the group. In this particular example, the group are playing back media content in synchrony. For example, a user has instructed the group of playback devices to play back a particular queue of media items, via a control device (not shown in FIG. 5A).

In FIG. 5A, the switch 214 is arranged in the second (ON) state. In this second state, power is supplied to the first playback device 204, and the first playback device 204 is able to play back media content in synchrony with the other members of the group. In examples where the first playback device 204 forms part of a ceiling speaker 202 and the ceiling speaker 202 also has an illumination device 206, light may also be emitted by the illumination device 206 when the switch 214 is arranged in this second (ON) state.

Figure 5B:
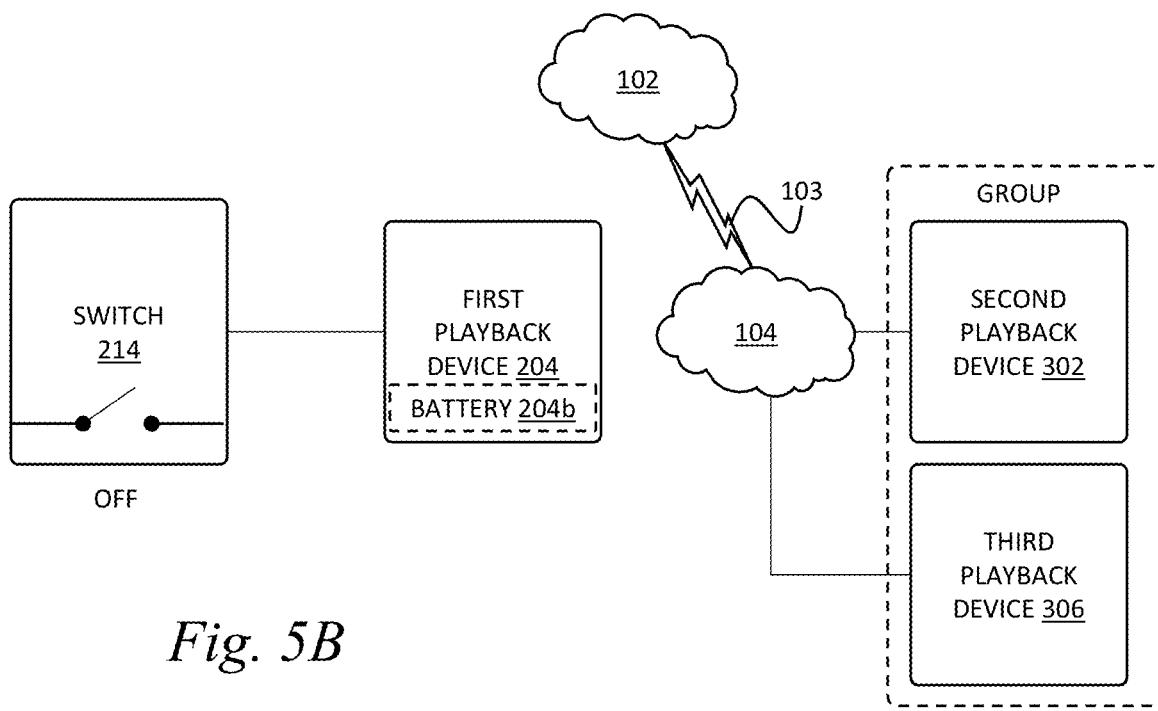
FIG. 5B is a schematic diagram of a portion of a media playback system at a second time.

FIG. 5B depicts the playback system of FIG. 5A at a later point in time. As is shown, the switch 214 is arranged in the first (OFF) state. As an example, the first playback device 204 is arranged in the master bathroom 101a of FIG. 1A, and a user may operate the switch 214 after having been in the bathroom. Operating the switch 214 results in a loss of power at the first playback device 204. As such, the first playback device 204 leaves the group, and so stops playing back media content. The group therefore no longer contains the first playback device 204, and instead has only two members—the second and third playback devices 302, 306. Assuming there are still media items in the playback queue, the second and third playback devices 302, 306 will continue uninterrupted play back of media content in synchrony as members of the group. If the ceiling speaker 202 was operating as the group coordinator of the group at the time of loss of power, group coordinator responsibilities may be handed off to the second or third playback devices 302, 206 including, for example, storing, tracking, or management of the playback queue. In some instances, storing, tracking, or management of the playback queue may be performed by a remote server in the cloud network, and the remote server may redirect playback queue responsibilities to the new group coordinator or other playback device in the group. When power is restored to the ceiling speaker 202, the ceiling speaker may adopt the playback queue of the group by, for example, rejoining the group, requesting the playback queue from the remote server, and/or obtaining the queue from another playback device in the system. In examples where the first playback device 204 forms part of a ceiling speaker 202 and the ceiling speaker 202 also has an illumination device 206 which is in operation, light ceases to be emitted by the illumination device 206 when the switch 214 is arranged in this first (OFF) state.

After having operated the switch 214, the same user, or another user, may realize that the first playback device 204 is no longer playing back media content, and therefore operates the switch 214 again. This operation causes the switch 214 to move from the first (OFF) state, back to the second (ON) state. Operating the switch 214 results in a resumption of power to the first playback device 204.

In some cases, it may be desirable for the first playback device 204 to rejoin the group so that it can resume playback of media content with other members of the group. For example, if a user turned the switch OFF without realizing that doing so would cause the first playback device 204 to stop playback of media content, upon resumption of power, it may be determined that the first playback device 204 should rejoin the group, because this action had been accidental or unintentional. This user behavior may be particularly prevalent in cases where the switch 214 also has an additional function, such as controlling the illumination device 206. Accordingly, based on certain criteria, the playback system may deduce whether it had been intended for the first playback device 204 to stop playing back the media content, and therefore determine whether to rejoin the group when power is resumed. As one example, if it is determined that the time period between the loss of power and resumption of power was short (for example, less than 5 minutes), it may be automatically determined that the first playback device 204 is to rejoin the group.

Figure 5C:
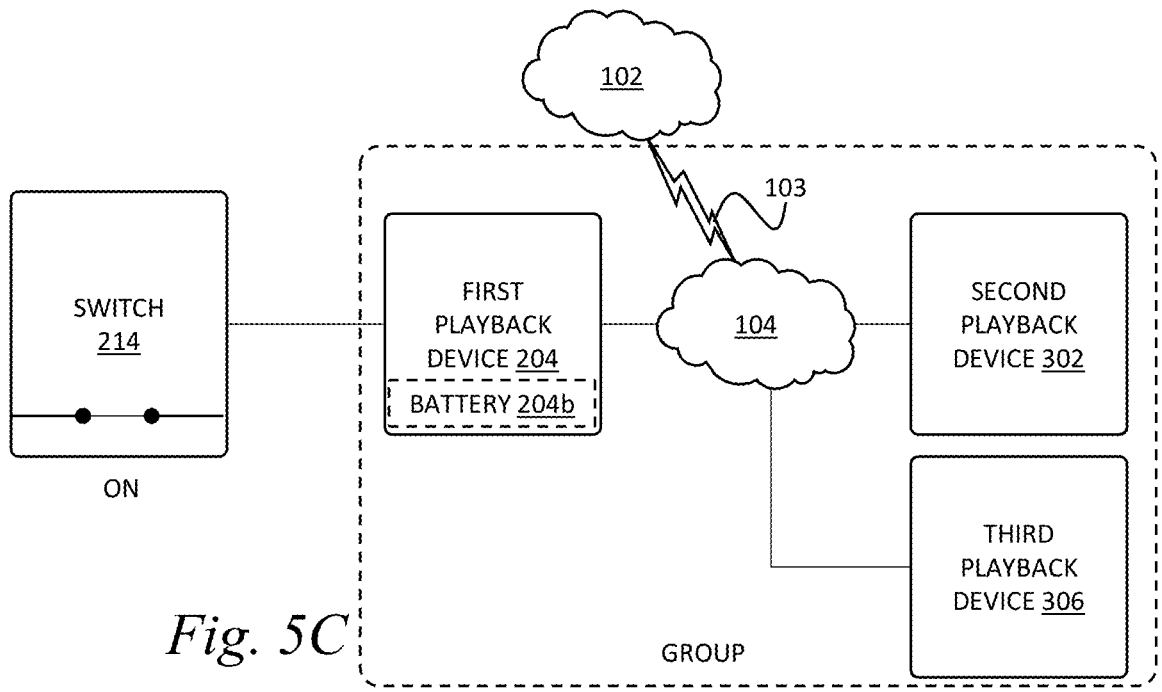
FIG. 5C is a schematic diagram of a portion of a media playback system at a third time.

Accordingly, FIG. 5C depicts the playback system of FIG. 5B at a later point in time. As is shown, the switch 214 is again arranged in the second (ON) state. As an example, the user may operate the switch 214 immediately after realizing that the previous operation of the switch 214 had caused the first playback device 204 to stop playback of media content in the bathroom. Operating the switch 214 results in a resumption of power to the first playback device 204 and, in this example, it is automatically determined that the first playback device 204 is to rejoin the group. The first playback device 204 therefore rejoins the group, and, assuming there are still media items in the playback queue, resumes playback of media content in synchrony with the first and second playback devices 302, 306. As illustrated in FIG. 5C, the group again contains the first, second and third playback devices 204, 302, 306. In examples where the first playback device 204 forms part of a ceiling speaker 202 and the ceiling speaker 202 also has an illumination device 206, light is once again emitted by the illumination device 206 when the switch 214 is arranged in this second (ON) state.

Figure 5D:
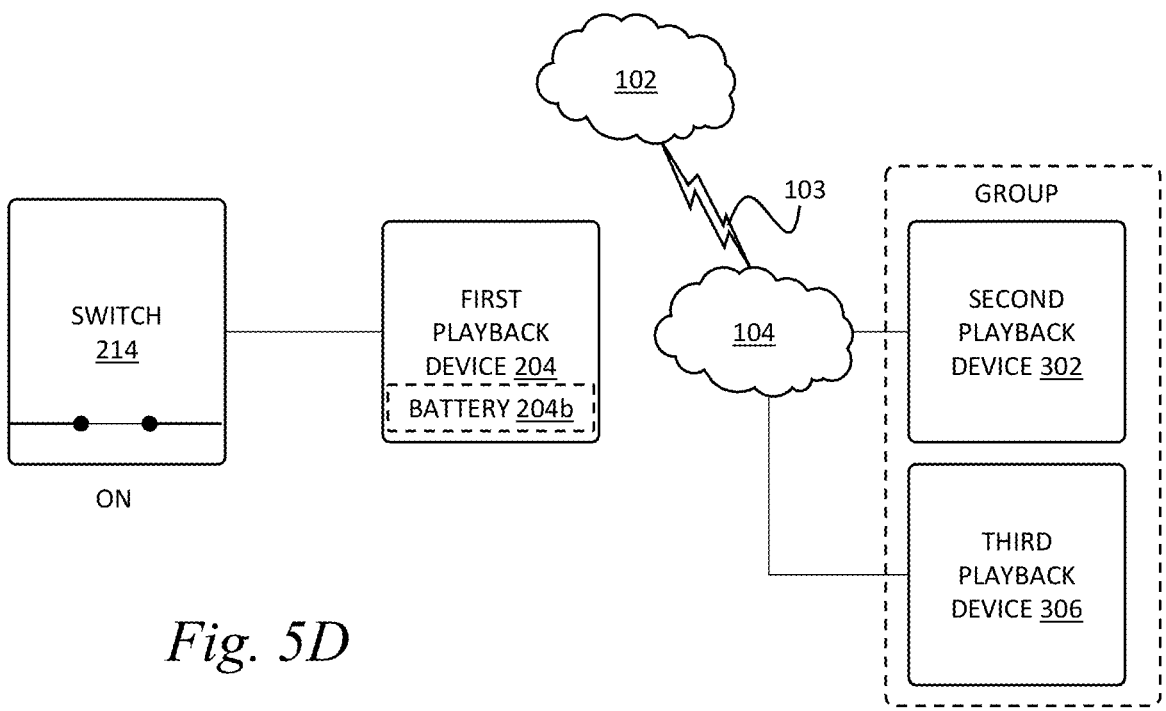
FIG. 5D is a schematic diagram of a portion of a media playback system at a fourth time.

FIG. 5D depicts an alternative scenario to that of FIG. 5C. In contrast with FIG. 5C, when the switch 214 is arranged in the second (ON) state, it is instead automatically determined that the first playback device 204 is not to rejoin the group. For example, based on certain criteria, the playback system may deduce that it had been intended for the first playback device 204 to stop playing back the media content, and accordingly determine not to rejoin the group when power is resumed. As one example, if it is determined that the time period between the loss of power and resumption of power was long (for example, greater than 5 minutes), it may be automatically determined that the first playback device 204 is not to rejoin the group.

Figure 6:
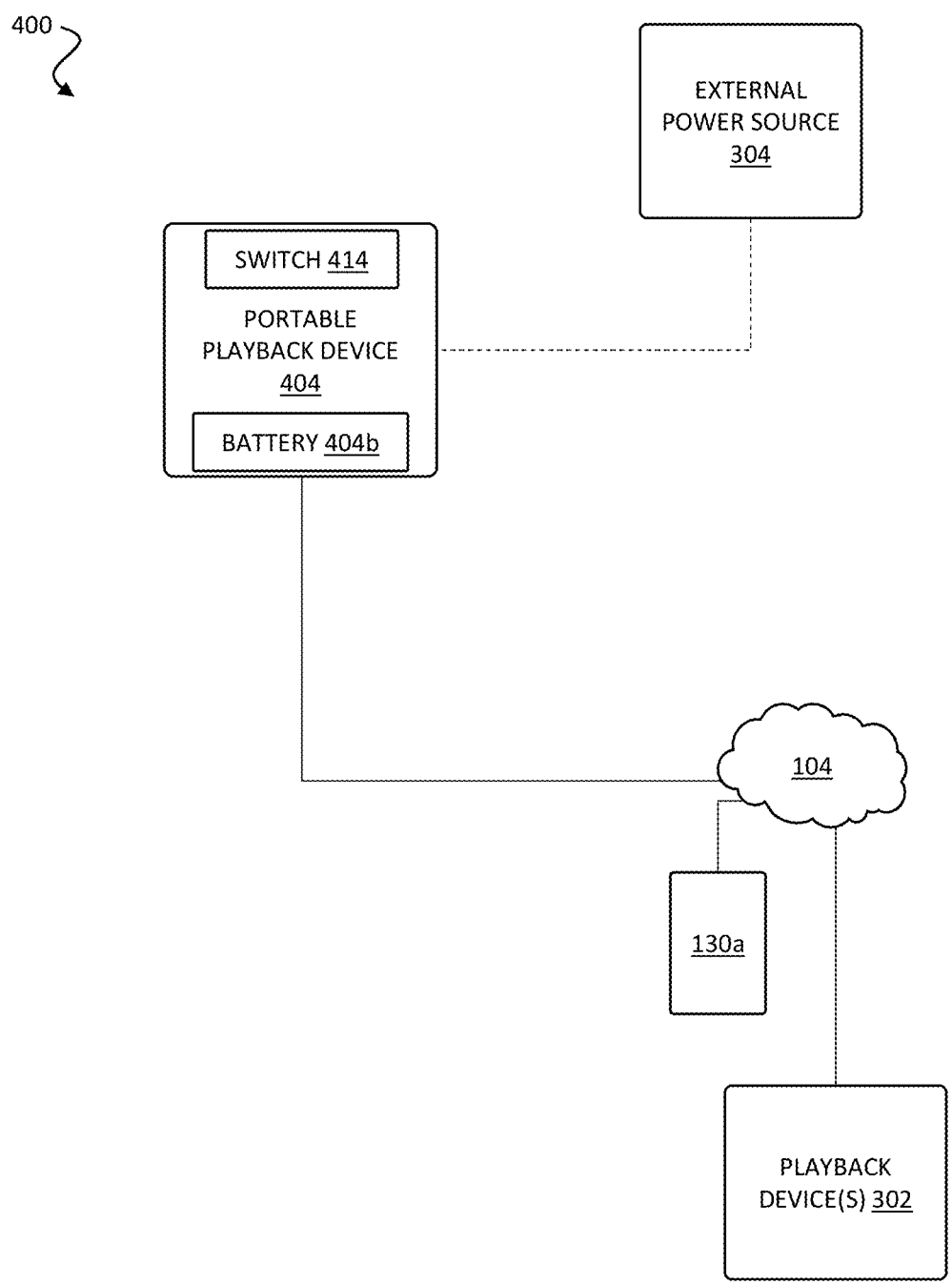
FIG. 6 is a schematic diagram of a portion of a media playback system comprising a portable playback device according to a first example.

Accordingly, FIG. 5D depicts the switch 214 arranged in the second (ON) state, which results in a resumption of power to the first playback device 204 and, in this example, it is automatically determined that the first playback device 204 is not to rejoin the group. The first playback device 204 therefore does not join the group, and may instead form a separate group. When instructed, the first playback device 204 may play back different media content to that being played back by the group containing the first and second playback devices 302, 306. As illustrated in FIG. 5D, the group contains the second and third playback devices 302, 306, but not the first playback device 204. In examples where the first playback device 204 forms part of a ceiling speaker 202 and the ceiling speaker 202 also has an illumination device 206, light is once again emitted by the illumination device 206 when the switch 214 is arranged in this second (ON) state. Portable Playback Device FIG. 6 is a schematic diagram of at least a portion of a media playback system 400, comprising a portable playback device 404. While all playback devices are portable to some extent, the term "portable playback device" is used here to indicate a playback device which is designed to be moved between locations rather than remain in a single location after installation. In the following examples, a portable playback device comprises an internal power source, such as a battery, to power the portable playback device.

Accordingly, FIG. 6 depicts the portable playback device 404 having a battery 404b configured to power the portable playback device 404. In some examples, the battery 404b acts as a power source when the portable playback device is not coupled to an external power source 304, i.e., when the portable playback device 304 is operating in a portable mode, rather than in a docked mode. Here, a "docked mode" refers to the portable playback device 404 when it is coupled to an external power source 304. In some examples, the portable playback device 404 may be simultaneously powered by the battery 404b and the external power source 304. In some examples, when coupled to an external power source 304, the portable playback device 404 is powered by the battery 404b, and the external power source 304 charges the battery 404b. In some examples, when coupled to an external power source 304, the portable playback device 404 is powered by the external power source 304 and, at the same time, the external power source 304 charges the battery 404b.

FIG. 6 shows a dashed line between the portable playback device 404 and the external power source 304. In this context, the dashed line indicates that the portable playback device 404 can be disconnected from the external power source 304. In this example, one or more electrical wires physically connect the portable playback device 404 to the external power source 304. In this way, power can flow from the external power source 304 to the portable playback device 404. A user may disconnect or unplug the portable playback device 404 from the external power source 304, when portability is required.

As shown, the portable playback device 404 also comprises a switch 414. In contrast to FIGS. 2A-5D, the switch 414 is integrated with the portable playback device 404, rather than being remote from the portable playback device 404. When the portable playback device 404 is not coupled to the external power source 304 (i.e., is operating in the portable mode), operation of the switch 414 causes a loss of power at the portable playback device 404. Operating the switch 414 therefore causes a loss of power from the battery 404b.

When the portable playback device 404 is coupled to the external power source 304 (i.e., is operating in the docked mode), operation of the switch 414 may also cause a loss of power at the portable playback device 404. Operating the switch 414 may therefore also cause a loss of power from the external power source 304.

The portable playback device 404 may further comprise a network interface (not shown) to facilitate the transmission of data between portable playback device 404 and one or more other devices on the data network 104. The network interface may provide a wired and/or a wireless transmission of data.

Figure 7:
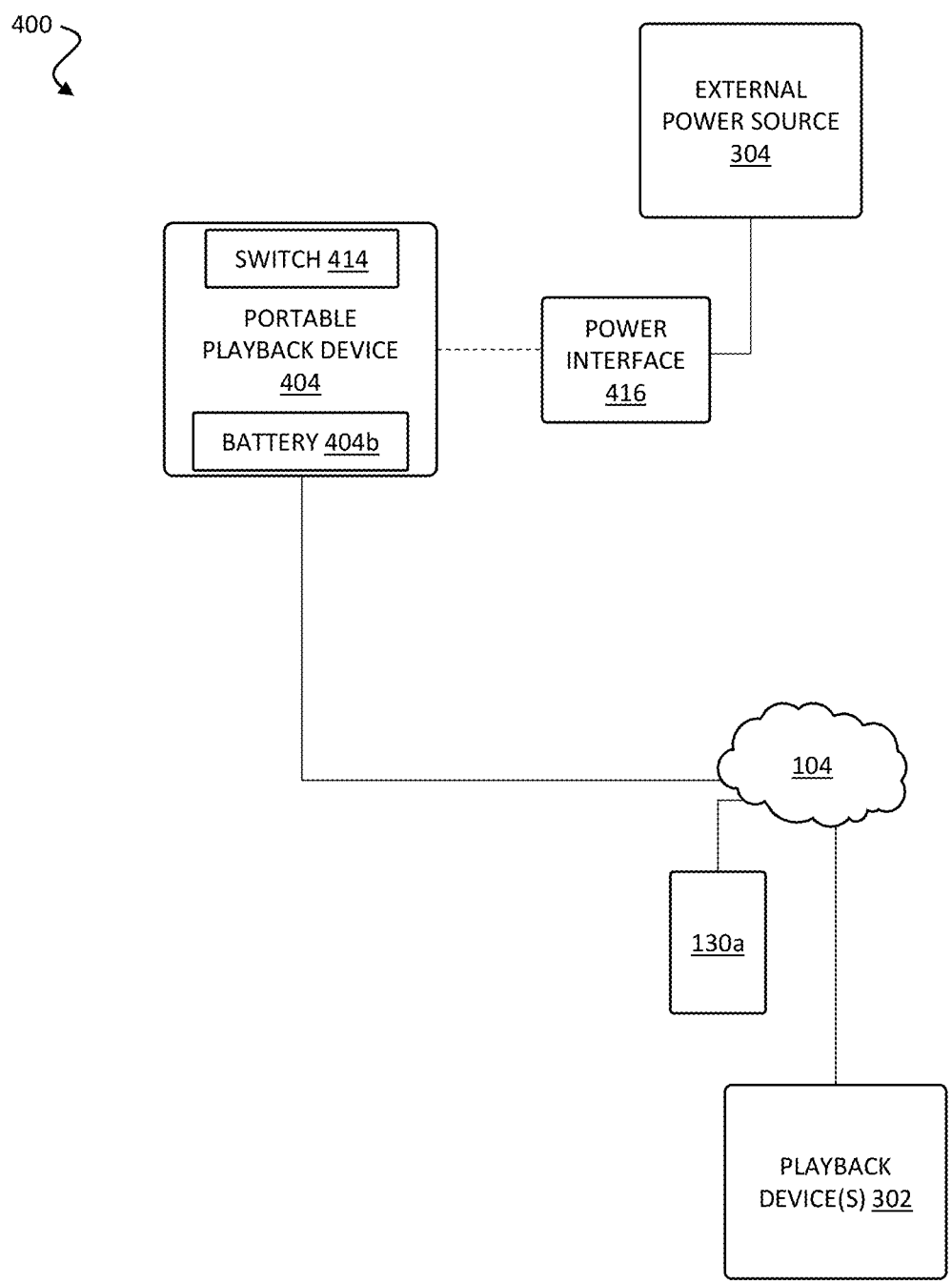
FIG. 7 is a schematic diagram of a portion of a media playback system comprising a portable playback device according to a second example.

FIG. 7 is a schematic diagram of an alternative arrangement of the media playback system 400 of FIG. 6. In contrast to FIG. 6, the portable playback device 404 is couplable to the external power source 304 via an intermediate power interface 416. In one example, the intermediate power interface 416 is a docking station into which the portable playback device 404 is positioned. When docked in the docking station 416, the portable playback device 404 can receive power from the external power source 304. In another example, the intermediate power interface 416 is a wireless charging interface (such as a wireless charging "mat") onto which the portable playback device 404 is arranged. When placed on the wireless charging interface, the portable playback device 404 can receive power from the external power source 304, via induction.

As described in previous examples, the portable playback device 404 can be grouped with other playback devices in the playback system 400. For example, a group may be formed comprising the portable playback device 404 and at least a second playback device 302.

Figure 8A:
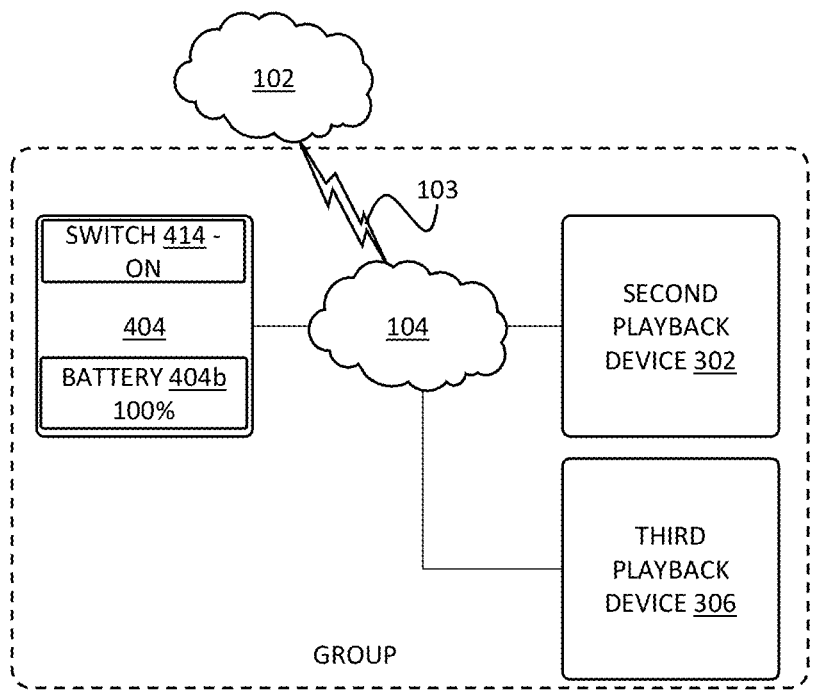
FIG. 8A is a schematic diagram of a portion of a media playback system comprising a portable playback device at a first time.

FIG. 8A depicts at least part of a playback system comprising a group of playback devices. In this example, the group comprises the portable playback device 404, a second playback device 302 and a third playback device 306. The dashed line surrounding the playback devices 404, 302, 306 illustrates members of the group. As such, at this moment in time, the portable playback device 404 and the second and third playback devices 302, 306 are all members of the group. In this particular example, the group are playing back media content in synchrony. For example, a user has instructed the group of playback devices to play back a particular queue of media items, via a control device (not shown in FIG. 8A). In FIG. 8A, the portable playback device 404 is operating in a portable mode, so is not connected to an external power source 304.

In FIG. 8A, the switch 414 on the portable playback device 404 is arranged in the second (ON) state. In this second state, power is supplied to the portable playback device 404 (from the battery 404b), and the portable playback device 404 is able to play back media content in synchrony with the other members of the group.

Figure 8B:
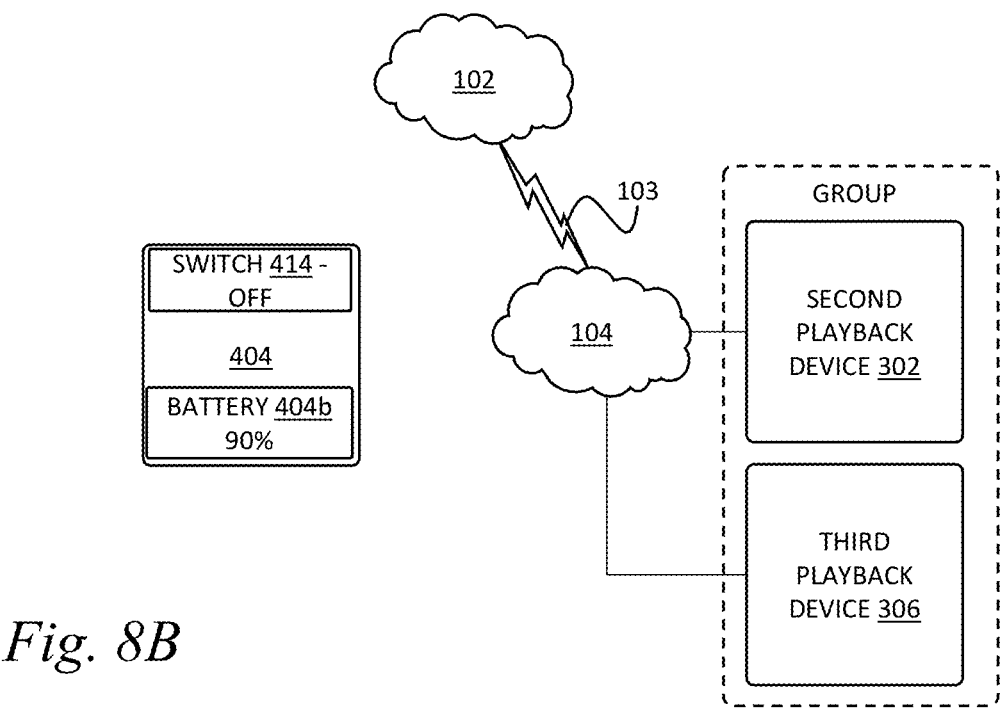
FIG. 8B is a schematic diagram of a portion of a media playback system comprising a portable playback device at a second time.

FIG. 8B depicts the playback system of FIG. 8A at a later point in time. As is shown, the switch 414 is arranged in the first (OFF) state. As an example, the portable playback device 404 is arranged on the outdoor patio 101i of FIG. 1A, and a user may operate the switch 414 because he is about to move indoors, where the second and third playback devices 302, 306 are located. Operating the switch 414 results in a loss of power at the portable playback device 404 and, as such, the portable playback device 404 leaves the group, so stops playing back the media content. The group therefore no longer contains the portable playback device 404, and instead has only two members—the second and third playback devices 302, 306. Assuming there are still media items in the playback queue, the second and third playback devices 302, 306 will continue playing back media content in synchrony as members of the group.

Given that the switch 414 is integrated with the portable playback device 404, it may be unlikely that the user accidentally operated the switch. This is in contrast to a separate or remote switch as in the examples of FIGS. 2A-5D, and especially in cases whether the separate switch has an additional purpose (such as controlling an illumination device). Accordingly, it may be assumed that when power is resumed (i.e., the switch 414 is arranged in the second (ON) state), the portable playback device 404 is not to rejoin the group. Thus, should the switch 414 be operated again (and be arranged in the second (ON) state), it may be automatically determined that the portable playback device 404 is not to rejoin the group.

Accordingly, based on certain criteria, the playback system may deduce that it had been intended for the portable playback device 404 to stop playing back the media content, and determine not to rejoin the group when power is resumed. As one example, if it is determined that the playback device is a portable playback device (identified by a playback device identifier, for example), it may be automatically determined that the playback device 404 is not to rejoin the group. As another example, if it is determined that the playback device has an integrated switch 414, it may be automatically determined that the playback device is not to rejoin the group.

Figure 8C:
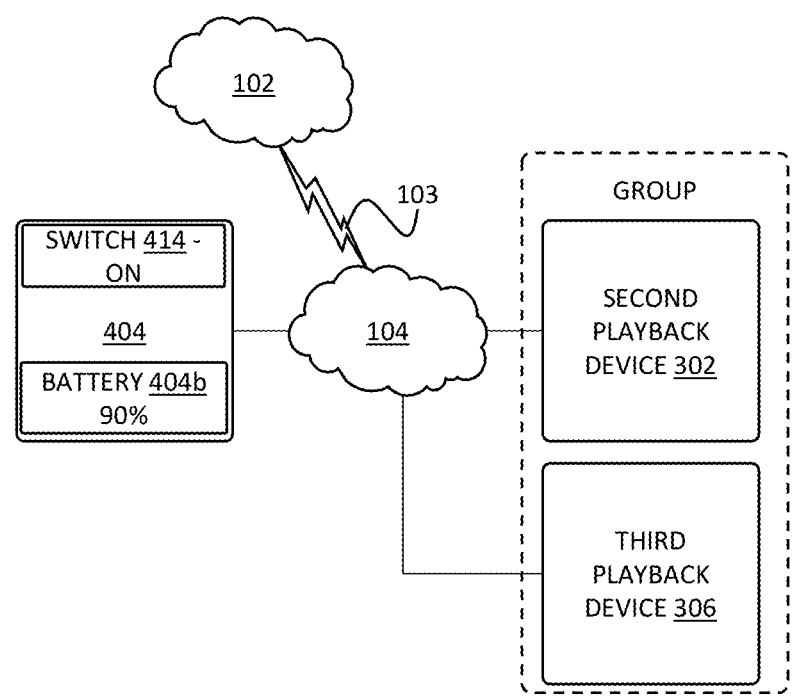
FIG. 8C is a schematic diagram of a portion of a media playback system comprising a portable playback device at a third time.

Accordingly, FIG. 8C depicts the switch 414 arranged in the second (ON) state, which results in a resumption of power to the portable playback device 404 and, in this example, it is automatically determined that the portable playback device 404 is not to rejoin the group. The portable playback device 404 therefore does not join the group, and may instead form a separate group. When instructed, the portable playback device 404 may play back different media content to that being played back by the group containing the first and second playback devices 302, 306. As illustrated in FIG. 8C, the group contains the second and third playback devices 302, 206, but not the portable playback device 404.

Figure 9A:
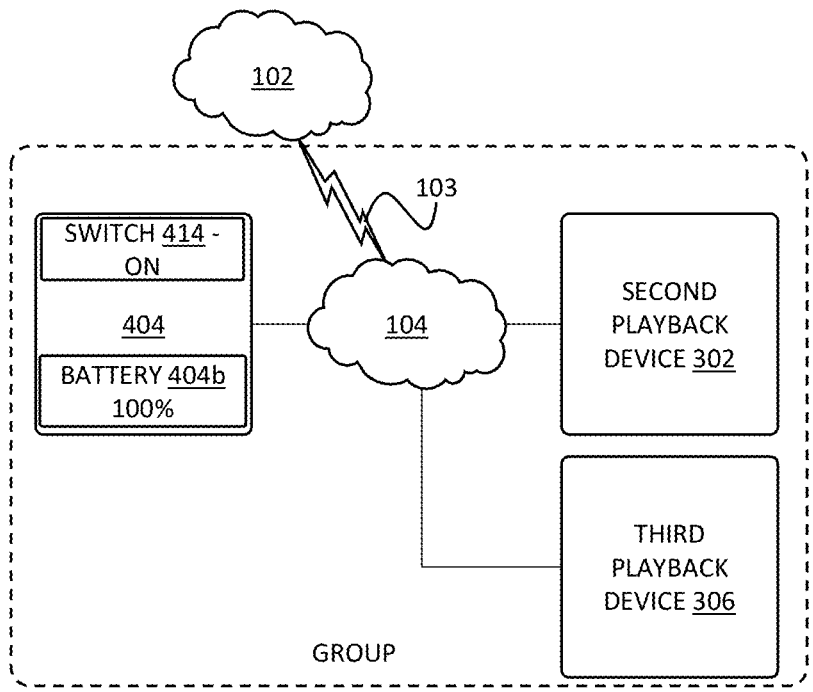
FIG. 9A is a schematic diagram of a portion of a media playback system comprising a portable playback device at a fourth time.
Figure 9B:
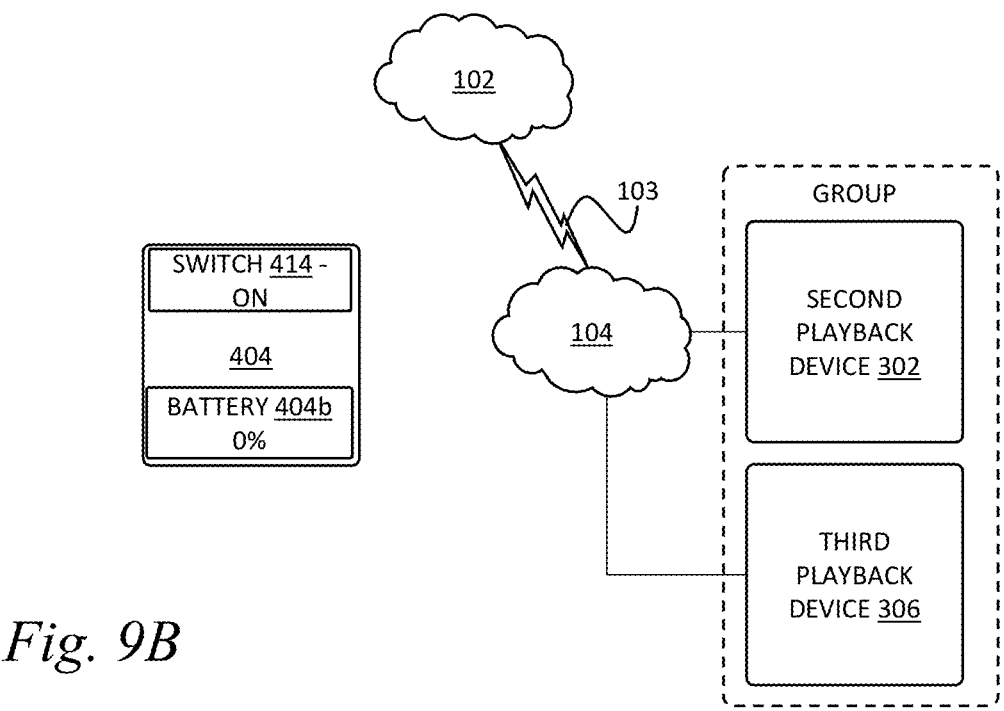
FIG. 9B is a schematic diagram of a portion of a media playback system comprising a portable playback device at a fifth time.
Figure 9C:
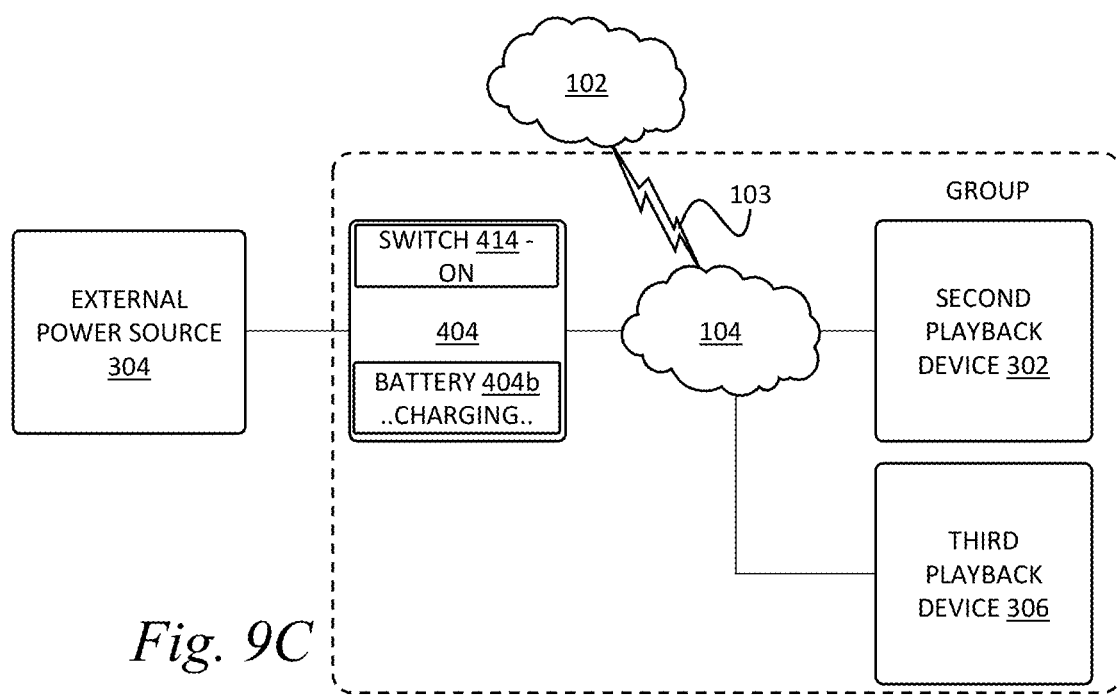
FIG. 9C is a schematic diagram of a portion of a media playback system comprising a portable playback device at a sixth time.

In another example, it may be determined, based on certain criteria, that a loss of power was not intended, and instead it is determined that the playback device is to rejoin the group when power is resumed. FIGS. 9A-9C depict such an example.

Accordingly, FIG. 9A depicts at least part of a playback system comprising a group of playback devices. As in FIG. 8A, the group comprises the portable playback device 404, a second playback device 302 and a third playback device 306. At this moment in time, the portable playback device 404 and the second and third playback devices 302, 306 are all members of a group and are playing back media content in synchrony. In FIG. 9A, the portable playback device 404 is operating in a portable mode, so is not connected to an external power source 304.

In FIG. 9A, the switch 414 on the portable playback device 404 is arranged in the second (ON) state. In this second state, power is supplied to the portable playback device 404 (from the battery 404*b*), and the portable playback device 404 is able to play back media content in synchrony with the other members of the group. FIG. 9A also indicates that a state of charge of the battery 404*b* is above a threshold level sufficient to power the portable playback device 404. In this example, the state of charge is 100% of full battery capacity, meaning that it is fully charged.

FIG. 9B depicts the playback system of FIG. 9A at a later point in time. As is shown, the switch 414 is arranged in the second (ON) state, but the battery 404*b* is now depleted, after having been used for an extended period. The state of charge is therefore below a threshold sufficient to power the portable playback device 404. In this particular example, the state of charge is 0%. Because the battery 404*b* is depleted, there is a loss of power at the portable playback device 404, and as such, the portable playback device 404 leaves the group, so stops playing back the media content. The group therefore no longer contains the portable playback device 404, and instead has only two members—the second and third playback devices 302, 306. Assuming there are still media items in the playback queue, the second and third playback devices 302, 306 will continue playing back media content in synchrony as members of the group.

Given that the battery 404*b* has depleted, it is likely that the user would like the portable playback device 404 to rejoin the group once power has been resumed to the portable playback device 404. Accordingly, it may be assumed that when power is resumed (i.e., the battery 404*b* has been recharged and/or the portable playback device 404 has been connected to the external power source 304), the portable playback device 404 is to rejoin the group.

Accordingly, based on certain criteria, the playback system may deduce that it had not been intended for the portable playback device 404 to stop playing back the media content, and accordingly determine to rejoin the group when power is resumed. In this example, if it is determined that the loss of power was due to a depleted battery (determined by monitoring a state of charge of the battery, for example), it may be automatically determined that the playback device 404 is to rejoin the group.

Accordingly, FIG. 9C depicts the portable playback device 404 coupled to an external power source 304 (via either method depicted in FIGS. 6 and 7), which results in a resumption of power to the portable playback device 404. In this example, it is automatically determined that the portable playback device 404 is to rejoin the group. The playback device 404 therefore joins the group, and, assuming there are still media items in the playback queue, resumes play back of media content in synchrony with the first and second playback devices 302, 306. As illustrated in FIG. 9C, the group again contains the portable playback device 404 and the second and third playback devices 302, 306. It should be noted that the switch 414 is also arranged in the second (ON) state, thereby allowing the portable playback device 404 to play back media content in synchrony with the other members of the group.

A Method of Determining Whether a Playback Device is to Rejoin a Group

FIGS. 2A-9C briefly describe some example methods of determining whether the playback device is to rejoin a previous group after a resumption of power. Further example methods will be described below, in relation to FIG. 10.

Figure 10:
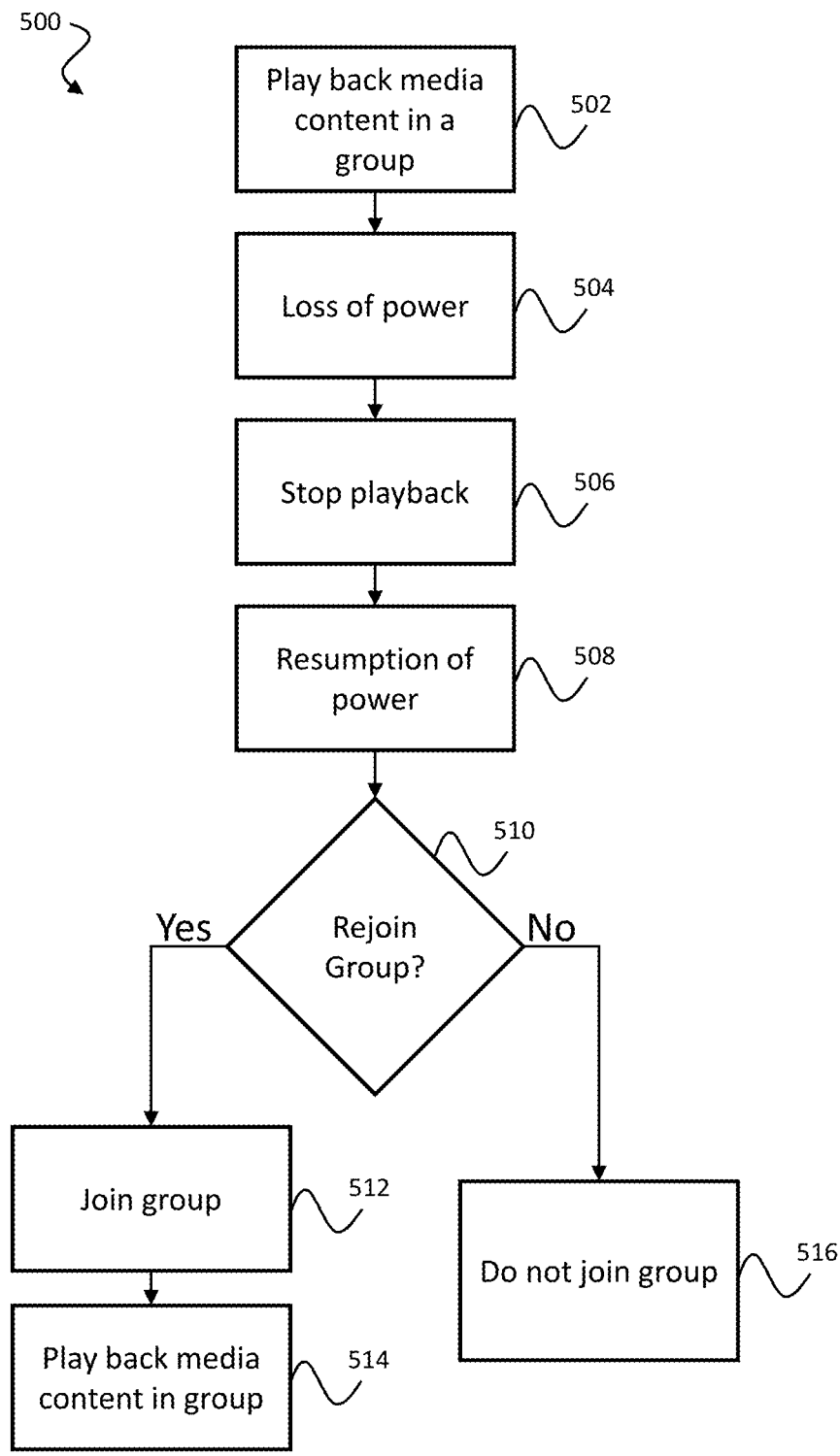
FIG. 10 is a flow diagram showing a method of determining whether a playback device is to rejoin a group after a resumption of power.

FIG. 10 depicts an example method 500 implemented by one or more devices in a playback system, such as a first playback device. At block 502, a first playback device plays back media content in synchrony with at least a second playback device. The first playback device may be, for example, the playback device 204 of FIGS. 2A-5C, or the portable playback device 404 of FIGS. 6A-9C. The first and second playback devices are playing back the media content as members of a group, and output audio into an environment. A user may have configured the group using the user interface 133 of a control device 130, for example. In some examples the group comprises just the first and second playback devices, and in other examples the group comprises three or more playback devices, such as in the examples of 5A-5D, 8A-8C and 9A-9C. In a particular example, a user has selected an icon "Play Everywhere" within the user interface 133 to cause all available playback devices within the playback system to play back the media content. Accordingly, in this particular example, all playback devices within the playback system form a single group and simultaneously play back the media content. The "Play Everywhere" icon may be useful if the user is hosting a party, for example, and wishes to play back media in all rooms/areas that contain one or more playback devices. In examples where the user has selected the "Play Everywhere" icon, a temporary or ad-hoc group may be established until the user deselects the "Play Everywhere" icon.

As briefly mentioned, members of the group may be identified through one or more state variables. For example, one or more state variables may identify the playback devices as members of a particular group, such as "Group 1" or a "Living Room Group" or a "Play Everywhere Group". The state variable may be stored in memory 112*b* of any or all of the playback devices within the group and/or within memory 112*b* of any or all of the playback devices within the playback system. The state variable may additionally or alternatively be stored in memory 132*b* of one or more control devices 130 and/or in memory of one or more computing devices 106 in a cloud network 102. State variables can be transmitted between various devices via network interfaces. For convenience, devices other than the first playback device may be referred to as "networked devices". For example, other members of the group, other playback devices in the playback system, control devices and computing devices in the cloud may all be known as networked devices.

At block 504, while the members of the group play back the media content, there is a loss of power at the first playback device 204, 404.

In a first example, as described in FIGS. 5B and 8B, the loss of power occurs in response to operation of a button or switch 214, 414. In FIG. 5B, the button or switch 214 is remote from the first playback device 204, and in FIG. 8B, the button or switch 414 is integrated with the first playback device 404. In some examples, operation of the switch causes a loss of power from an external power source 304 and in other examples, the operation of the switch causes a loss of from an internal power source, such as a battery.

In a second example, as described in FIG. 9B, the loss of power occurs in response to a battery of the first playback device 404 being depleted. For example, a state of charge of the battery falls below a threshold state of charge. The threshold may be the state of charge required to maintain operation of the first playback device as a member of the group, and may not always mean that the battery is fully depleted. In one example, the threshold state of charge is 5% of full battery capacity and, should the state of charge fall below this threshold, the battery is considered depleted. In another example, the threshold is 0% of full capacity.

In some examples, the first playback device may have multiple sources of power, and the loss of power is a loss of power from one or more of the sources of power. For example, FIGS. 3 and 4 depict a playback device 204 (or the ceiling speaker 202) having a battery 204*b* as well as being connected to an external power source 304. The loss of power may therefore be due to a loss of power from the external power source, such as when the switch 214 is operated. As another example, FIGS. 6 and 7 depict a playback device 404 having a battery 404*b* as well as being couplable to an external power source 304. The loss of power may therefore be due to a loss of power from the battery 404*b*, such as when the battery 404*b* is depleted.

In response to the loss of power, the first playback device stops playback of the media content in block 506. In some examples, the loss of power causes the first playback device to immediately power off, thereby interrupting playback. For example, operation of a switch may instantaneously break an electrical connection from a power source, thereby causing an immediate loss of power to the first playback device. In other examples, the first playback device may detect an instruction, signal or command to power off or shut down the first playback device. For example, as described in relation to FIGS. 3 and 4, the switch 214 may comprise a network interface to transmit data to the first playback device 204. Receipt of the data by the first playback device 204 causes the first playback device 204 to power off, and thereby cause a loss of power. Accordingly, in this example, the first playback device may detect an input to the button or switch, and responsively, turn off the first playback device. Thus, in some examples, there may be a time delay between operation of the switch 214 and the loss of power. Turning off the first playback device comprises stopping playback of the media content. Thus, in this example, the first playback device is aware that it is to be powered off. When instructed to turn off, the first playback device may also inform the other members of the group and/or other networked devices that it is leaving the group and/or is about to be powered off. This can inform other members of the group that they are no longer required to transmit data, such as media content, to the first playback device.

In either case, the loss of power results in the first playback device stopping playback of media content, and the other remaining members of group continue to play back the media content. Block 506 may comprise the first playback device leaving the group.

In block 508, there is a resumption of power to the first playback device. In a first example, as described above with reference to FIGS. 5C and 8C, the resumption of power occurs in response to operation of a button or switch 214, 414. In some examples, the operation of the switch causes a resumption of power from an external power source 304 and in other examples, the operation of the switch causes a resumption of power from a battery.

In a second example, as described above with reference to FIG. 9C, the resumption of power occurs in response to the first playback device being connected/coupled to an external power source (after having experienced a loss of power due to a depleted battery).

In some examples, the first playback device may have access to multiple sources of power, and the resumption of power is a resumption of power from one or more of the sources of power. The examples of FIGS. 3 and 4 above include a playback device 204 (or the ceiling speaker 202) having a battery 204*b* as well as being connected to an external power source 304. The resumption of power may therefore be due to a resumption of power from the external power source, such as when the switch 214 is operated. The examples of FIGS. 6 and 7 include a playback device 404 having a battery 404*b* as well as being couplable to an external power source 304. The resumption of power may therefore be due to a resumption of power from an external power source, such as when the playback device 404 is coupled to the external power source 304.

After or in response to the resumption of power, in block 510, it is automatically determined whether the first playback device is to rejoin the group. As briefly described above with reference to FIGS. 2A-9C, it is determined whether the first playback device is to rejoin the group based on one or more criteria or rules. Different examples are described below. In this context, "automatically determined" may mean that the determination to rejoin the group is taken without user intervention or input. For example, the criteria or rules are assessed and a decision is taken to rejoin the group without receiving further input.

Rejoin Group Based on Time Period

In a first example, after the resumption of power, the decision as to whether the first playback device is to rejoin the group is based on a time period between the loss of power and the resumption of power. Accordingly, one or more devices may determine a first time associated with a loss of power at the first playback device and a second time associated with a resumption of power to the first playback device. The timestamp may be determined based on a counter or other time-based clock. The first time may be recorded as a first timestamp, and the second time may be recorded as a second timestamp, for example. As an example, it may be determined for the first playback device to rejoin the group in cases where the time period (the time difference between the first and second timestamps) is short (such as less than 5 minutes).

It will be appreciated that the first time may not be the exact time at which the loss of power occurred, but may be a time corresponding to an associated event which preceded or followed the loss of power. For example, the first time may instead be the time at which the first playback device one of: (i) stopped playing back the media content, (ii) left the group, (iii) was determined to have left the group by one or more networked devices, (iv) was determined to have disconnected from the network 104 by one or more networked devices (or lost connectivity with a networked device), (v) detected a loss of power, or (vi) received an instruction or command to power off (such as an input from a switch), etc. Other examples are envisioned. The first time is therefore a time associated with the loss of power, rather than being the exact time at which power was lost. Similarly, the second time may not be the exact time at which there was a resumption of power, but may be a time corresponding to an associated event which preceded or followed the resumption of power. For example, the second time may instead be the time at which the first playback device: (i) detected a resumption of power, (ii) received an instruction or command to power on (such as an input from a switch), (iii) reconnected to the network 104, or (iv) was determined to have (re)connected to the network 104 by one or more networked devices (or resumed connectivity with a networked device), etc. Other examples are envisioned. The second time is therefore a time associated with the resumption of power, rather than being the exact time at which power resumed.

The first playback device may itself determine the time period between the loss of power and the resumption of power. For example, the first playback device may store in persistent or non-volatile storage the first timestamp and the second timestamp, when any of the above events occur. The first and second timestamps could be stored in a log file. Upon resumption of power, the first playback device may therefore determine the time period by determining the time difference between the first and second timestamps. The first playback device may itself be able determine the time period because it comprises a battery and/or because it can detect a loss/resumption of power (such as detecting user input to a switch).

In another example, a networked device may determine the time period between the loss of power and the resumption of power. For example, it may store in memory or other storage the first timestamp and the second timestamp, when any of the above events occur. These events can be inferred by the networked playback device. For example, after the loss of power the networked device may cease to receive periodic transmissions of data (such as state variables and/or acknowledgements and/or keep alive messages) from the first playback device, and therefore determine/deduce that the first playback device has disconnected from the network 104 and/or has left the group. In another example, the networked device may receive data (such as a state variable) from the first playback device to indicate that the first playback device has experienced a loss of power, and/or is about to leave (or has left) the group. In one example, the first playback device itself determines the first timestamp and transmits this to the networked device. The first playback device may be able to communicate with the networked device even after a loss of power in cases where the first playback device has a battery. The networked device may therefore store in memory or other storage a first timestamp associated with the loss of power.

In some instances, the networked device determining whether the first playback device is no longer part of the group may be the group coordinator of the group. The first playback device can send a message to the group coordinator of the group indicating that the first playback device is ungrouping from the group. In another example, the group coordinator can determine that the first playback device has left the group if the group coordinator can no longer reach the first playback device or is no longer receiving communications from the first playback device for a particular period of time (e.g., 30 seconds, 1 minute, 5 minutes). For example, the group coordinator may cease receiving communications (e.g., acknowledgement messages, keep alive messages) from the first playback device. After the group coordinator has determined that the first playback device has left group, the group coordinator updates and stores in the state information an indication that the first playback device has left the group, is no longer a member of the group, or is missing from the group or media playback system. The state information may be stored locally in each playback device or in a computing system remote from the media playback system.

Similarly, upon resumption of power, the networked device may begin to receive periodic or aperiodic transmissions of data (such as state variables and/or acknowledgements and/or keep alive messages) from the first playback device, and therefore determine/deduce that the first playback device has (re)connected to the network 104. In another example, the networked device may receive data (such as a state variable) from the first playback device to indicate that the first playback device has experienced a resumption of power. The networked device may therefore store in memory a second timestamp associated with the resumption of power. In one example, the first playback device itself determines the second timestamp and transmits this to the networked device or to the remote server.

Upon resumption of power, the networked device may therefore determine the time period by determining the time difference between the first and second timestamps. In some examples, the determined time period is then transmitted from the networked device to the first playback device. In some examples, the networked device does not determine the time period, but instead transmits the first and second timestamps to the first playback device, or another playback device in the group.

Regardless of how the time period is determined, it may be determined that the first playback device is to rejoin the group if the time period is less than a predetermined threshold. Conversely, it may be determined that the first playback device is to not rejoin the group if the time period is greater than the predetermined threshold. The threshold may be about 5 minutes, 4 minutes, 3 minutes, 2 minutes, 1 minute, 30 seconds, 20 seconds, 10 seconds or 5 seconds, for example. If the time period is less than the predetermined threshold, it may be assumed that the loss of power was accidental, and it is likely that a user would like the first playback device to rejoin the group. Such an example was described in relation to FIG. 5C, where it was determined that the time period between the first (OFF) state and the second (ON) state was short. Accordingly, based on the time period, it may be determined whether the first playback device is to rejoin the group.

As another example, it may be determined that the first playback device is to rejoin the group based on the time of day. For example, the system may determine that the current time is during quiet hours or sleeping hours (e.g., 2:00 am) and prevent the first playback device from rejoining the group. In some instances, the user may set sleeping hours to start at a predetermined time and turn off when the alarm is activated or turned off.

The determination as to whether the first playback device is to rejoin the group may be made by the first playback device itself, the networked device (such as a control device, a remote computing device, or another playback device). In a particular example, the determination is made by a group coordinator of the group.

Rejoin Group Based on State of Charge

In a second example, after the resumption of power, the decision as to whether the first playback device is to rejoin the group may be additionally or alternatively based on the state of charge of an internal power source, such as a battery, being less than a threshold. Accordingly, one or more devices may monitor and determine the current state of charge of the battery of the first playback device and determine whether the first playback device is to rejoin the group based on the current state of charge. The current state of charge may be the state of charge prior to the loss of power (such as immediately before to the loss of power) or may be the state of charge after the resumption of power (such as immediately after the resumption of power). In some examples, the state of charge prior to the loss of power is substantially the same as the state of charge after the resumption of power.

As an example, it may be determined for the first playback device to rejoin the group in cases where the current state of charge of the battery is below a threshold. In such a case, because the state of charge is less than the threshold, it may be inferred that the loss of power was due to a depleted battery. As such, the decision as to whether the first playback device is to rejoin the group may be additionally or alternatively based on a determination that the loss of power was due to a depleted battery.

As mentioned, the state of charge of the battery can be monitored over time. In an example, the first playback device monitors the state of charge of the battery before the loss of power, determines a current state of charge of the battery and stores the current state of charge in persistent or non-volatile storage. In another example, the first playback device determines a current state of charge of the battery and transmits the current state of charge to another networked device, which then stores the current state of charge in memory. In this case, the networked device monitors the state of charge.

The current state of charge may be saved as a state variable named "current state of charge", for example. In some examples, the current state of charge state variable is associated with the first playback device.

The current state of charge can be monitored/measured/determined periodically. For example, it may be determined once every 5 minutes, 4 minutes, 3 minutes, 2 minutes, 1 minute, 30 seconds, 20 seconds, 10 seconds, etc. The first playback device (or networked device) may therefore update/overwrite the current state of charge state variable periodically, or may store a history of the state of charge over time.

As mentioned previously, the loss of power may be due to a depletion of the battery and the resumption of power may be due to the first playback device being connected to an external power source. Upon resumption of power, it may be determined whether the loss of power was due to a depleted battery. For example, the current state of charge can be determined. In examples where the current state of charge is the last known state of charge prior to the power loss, the current state of charge can be read from the memory of the first playback device or can be received from a networked device. In examples where the current state of charge is the first known state of charge after the resumption of power, the current state of charge can be read from the memory of the first playback device. The first playback device, or the networked device, can compare the current state of charge with a threshold state of charge and it may be determined that the first playback device is to rejoin the group if the current state of charge is less than the threshold. Conversely, it may be determined that the first playback device is to not rejoin the group if the current state of charge is greater than the threshold. The threshold may be about 5% of full battery capacity, for example. If the current state of charge is less than the threshold, it may be assumed that the loss of power was due to the battery being depleted, and it is likely that a user would like the first playback device to rejoin the group. Such an example was described in relation to FIG. 9C. Accordingly, based on the current state of charge, it may be determined whether the first playback device is to rejoin the group.

The determination as to whether the first playback device is to rejoin the group may be made by the first playback device itself, the networked device (such as a control device, a remote computing device, or another playback device). In a particular example, the determination is made by a group coordinator of the group.

Rejoin Group Based on a Configuration State

In a third example, after the resumption of power, the decision as to whether the first playback device is to rejoin the group is based on a configuration state of the first playback device. Accordingly, one or more devices may determine a configuration state of the first playback device and determine whether the first playback device is to rejoin the group based on the configuration state. Configuration states may include, for example, a device condition, a device identifier, a device property or characteristic, or members of the group prior to the loss of power and/or after the resumption of power.

A device condition is data that identifies the current mode or behavior of the first playback device, such as "active", "standby", "offline", "low power", "charging", "using battery power", "using external power", "portable mode", "docked mode" etc. A device identifier is data that identifies or is associated with the first playback device. Examples may include a device make or model, such as "SONOS MOVE", or an alphanumeric string associated with a particular make or model, such as "ASX101". A device property or characteristic is data that identifies a certain feature or component of the first playback device. Examples may identify whether the device "has a battery", "is portable", "has integrated switch" or "is a ceiling speaker". Members of the group prior to the loss of power may identify the specific devices, or the number of devices, present in the group before the loss of power and members of the group after the resumption of power may identify the specific devices, or the number of devices, present in the group after the resumption of power.

In some examples, the configuration state changes over time, such as a device condition or a listing of the current and previous members of the group. In other examples, the configuration state remains constant over time. Configuration states may be represented as one or more state variables. For example, for configuration states that remain constant over time, the configuration state may be represented as a single state variable and for configuration states that may change over time, the configuration states may be represented by a plurality of state variables, where each state variable is associated with a period in time. In this way, changes in configuration states can be determined.

As an example, the decision as to whether the first playback device is to rejoin the group may be based on a determination that the configuration state corresponds to a particular configuration state. For example, the decision to rejoin may be based on a determination that the device identifier corresponds to a particular device identifier or based on a determination that the device property or characteristic corresponds to a particular device property or characteristic. As one example, the decision to rejoin may be based on a determination that the device is portable and/or has a battery.

As another example, the decision as to whether the first playback device is to rejoin the group may be based on a determination that the configuration state has changed (i.e., a current configuration state does not correspond to a previous configuration state). As a first example, the decision to rejoin may be based on a determination that members of the group prior to the loss of power do not correspond to members of the group after the resumption of power. For example, there may be a change in the members of the group. New members may have been added to the group or existing members may have been removed from the group. If the makeup of the group has been modified (e.g., the number of devices and/or specific devices within the group prior to the loss of power do not correspond to the number of devices and/or specific devices within the group after the resumption of power), it may be determined that the first playback device is not to rejoin the group.

For example, in FIG. 1A, the family room 101d comprises four playback devices 110h-k in a group, and the group comprises a first playback device. The family room group may be operating to provide surround sound in a home theatre environment, for example. The user may then switch off one or more of the playback devices in the group, including the first playback device, and reconfigure the group to have just two playback devices (for listening to audio, for example). At a later time, the user switches on the first playback device, and may move this device to another room. It is then determined that the members of the family room group prior to the loss of power to the first playback device do not correspond to the members of the family room group after the resumption of power (i.e., there were initially three other devices (not including the first playback device), and there are now only two devices). Accordingly, it is determined that the first playback device is not to rejoin the group. This may be useful because the reconfiguration of the family room group by the user indicates that the user intended these devices to specifically be in the group, and so it may be inferred that no further devices are to automatically join the group.

As another example, the group may include all playback devices in the home such as playback devices in the bedroom, kitchen, and bathroom, and one of the playback devices (e.g., bathroom playback device) in the group loses power. When power is returned to the bathroom playback device, a device in the group (e.g., group coordinator) may determine that the bedroom playback device has been removed from the group, and in response to this change in the membership of the group, the group coordinator and/or bathroom playback device may decide not to rejoin the group that the bathroom playback device was previously a member of.

Conversely, if the number of devices and/or specific devices within the group prior to the loss of power correspond to the number of devices and/or specific devices within the group after the resumption of power, it may be determined that the first playback device is to rejoin the group. Again, referring to the example of FIG. 1A discussed above, there may be four playback devices 110h-k in a group in the family room 101d, where the group includes the first playback device. The family room group may be operating to provide surround sound in a home theatre environment, for example. There may then be a loss of power to the first playback device. At a later time, after power is resumed to first playback device, it is determined that the members of the family room group prior to the loss of power to the first playback device correspond to the members of the family room group after the resumption of power (i.e., there were initially three other devices (not including the first playback device), and there are still three other devices). Accordingly, it is determined that the first playback device is to rejoin the group.

As a second example, the decision to rejoin may be based on a determination that a device condition has changed. For example, if the first playback device was operating in portable mode prior to the loss of power and is operating in docked mode after the resumption of power, it may be determined that the first playback device is to rejoin the group (i.e., this change may indicate that there was a loss of power due to a depleted battery). Conversely, if the first playback device was operating in portable mode prior to the loss of power and is operating in portable mode after the resumption of power, it may be determined that the first playback device is not to rejoin the group. As a third example, the decision to rejoin may be based on a determination that a device condition has changed. For example, if the first playback device was operating in "active" mode prior to the loss of power, then was operating in a "standby" mode and an "offline" mode after the loss power and before the resumption of power, it may be determined that the first playback device is not rejoin the group. Conversely, if the first playback device was operating in "active" mode prior to the loss of power, then was operating only in a "standby" mode after the loss power and before the resumption of power, it may be determined that the first playback device is to rejoin the group. The device may move from the standby mode to the offline mode after a certain period of time, such as after 5 minutes.

The first playback device may itself store one or more configuration states of the first playback device. Additionally, or alternatively, one or more networked devices may store one or more configuration states of the first playback device. A configuration state may therefore be associated with the first playback device.

The determination as to whether the first playback device is to rejoin the group may be made by the first playback device itself, the networked device (such as a control device, a remote computing device, or another playback device). In a particular example, the determination is made by a group coordinator of the group (i.e., a master playback device).

Returning again to FIG. 10, block 510 comprises automatically determining whether the first playback device is to rejoin the group. Described above are various rules or criteria that may be assessed to make such a determination. It should be noted that the determination may, in some examples, be based on one or more of the above-described criteria. For example, the decision whether to rejoin the group may be based on satisfying two or more criteria, such as being based on one or more of: (i) the time period between the loss of power and the resumption of power being less that a threshold, (ii) the current state of charge being less than a threshold and (iii) based on a configuration state.

If in block 510 it is determined that the first playback device is to rejoin the group, the method progresses to block 512. In block 512, the method comprises joining/adding the first playback device to the group. The method of joining may vary or comprise additional or alternative steps depending upon which device determined that the first playback device is to rejoin (whether it was the first playback device itself, or another networked device).

For example, if the first playback device determined it was to rejoin in block 510, then the first playback device may transmit a request to join the group to one or more networked devices, such as a control device, another playback device in the group (such as the group coordinator), another playback device in the playback system, or a computing device in the cloud. Receipt of this request may then trigger a grouping procedure. If another networked device determined that the first playback device is to rejoin the group in block 510, then the networked device may transmit such an indication to the first playback device. Upon receipt of the indication, the first playback device may transmit a request to join the group to one or more of the networked devices, as described above. These networked devices include an intermediate device and a group coordinator. In one example, the first playback device transmits a request to join the group to an intermediate device, such as a hub. From here, the intermediate device transmits the request to a group coordinator. Receipt of this request by the group coordinator then triggers a grouping procedure. In another example, the first playback device transmits a request to join the group to an intermediate device, such as a hub. Receipt of this request by the intermediate device then triggers a grouping procedure. In a further example, the first playback device transmits a request to join the group to the group coordinator, and the group coordinator may transmit data to the intermediate device indicating that it is adding/joining the first playback device to the group.

The request to join the group command message may comprise at least one of the following data fields: data identifying the group coordinator (or the intermediate device), a household identifier, data identifying the first playback device, an IP address of the first playback device, etc.

In a further example, the grouping procedure may begin without requiring the first playback device to transmit a request. Alternative grouping procedures are envisaged.

After the first playback device has rejoined the group, the method may comprise, in block 514, playing back media content in synchrony with the other members of the group. In some examples, block 514 also comprises determining, by the first playback device, that the members of the group are currently playing back media content. Playing back the media content comprises receiving the media content from a media source.

As an alternative to block 514, the method may comprise determining, by the first playback device, that the members of the group are not currently playing back media content. For example, a user may have paused playback or there may be no media items in the playback queue. In response, the first playback device may await receipt of media content and/or await receipt of a command to begin playing back media content.

If in block 510 it is determined that the first playback device is not to rejoin the group, the method progresses to block 516. In block 516, the method comprises not joining the first playback device to the group. Not joining the first playback device to the group may comprise forming a second group comprising only the first playback device. In response, the first playback device may await receipt of media content and/or await receipt of a command to begin playing back media content.

Indication that the First Playback Device has been Switched Off

As mentioned above in reference to FIGS. 5A-5D, in some examples, the first playback device 204 (or the ceiling speaker 202) may also comprise a battery 204b. Accordingly, when the switch is arranged in the first (OFF) state in FIG. 5B, the battery 204b may still provide power to at least some components of the ceiling speaker 202, such as the first playback device 204. As mentioned, the loss of power comprises loss of power from the external power source 304 and the resumption of the power comprises a resumption of power from the external power source 304. Accordingly, prior to the loss of power, the first playback device is powered by the external power source, and in response to the loss of power, can be powered (at least partially) by the battery. After the resumption of power, the first playback device is again powered by the external power source.

In certain examples, powering the first playback device by the battery may comprise powering the first playback device by the battery for a predetermined period of time, and after the predetermined period of time, ceasing to power the playback device by the battery. In some examples, given that the battery may only power the first playback device for a predetermined period of time after the loss of power, determining whether to rejoin the group in block 510 may comprise determining whether the first playback device is being powered by the battery. For example, if it is determined that the first playback device is being powered by the battery, it is determined to rejoin the group. Conversely, if it is determined that the first playback device is not being powered by the battery (or is no longer being powered by the battery), it is determined not to rejoin the group.

As a result of having a battery, as well as being couplable to an external power source, the first playback device may also output an audible alert in response to loss of power. The battery can therefore provide power even after the loss of power from the external power source. The audible alert serves to notify a user that the first playback device has experienced a loss of power and is no longer a member of the group (or is about to leave the group). The audible alert may be, for example, an audible tone, such as a chime or alarm, or a spoken information (from a VAS, for example). Upon hearing the audible alert, the user may decide to take mitigating action, such as activate the switch to cause a resumption of power to the first playback device.

In some examples, the first playback device may also output an audible alert in response to loss of power even if the first playback device does not have a battery. For example, as mentioned, the switch 214 may also comprise a network interface to facilitate the transmission of data between the switch and the first playback device. Operation of the switch can cause data to be transmitted to the first playback device before the first playback device experiences a loss of power. Accordingly, the first playback device may detect an input to the button or switch (i.e., may receive the data from the switch), and responsively, output an audible alert before the loss of power.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most-effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device, comprising:
   an interface configured to receive media content for playback;
   a speaker;
   a storage;
   a power supply; and
   a processing system;
   wherein the storage comprises non-transitory computer-readable instructions that, when executed by the processing system, instruct the playback device to:
      play back, via the speaker, the media content in synchrony with at least a second playback device, wherein the playback device and the second playback devices are playing back the media content as members of a group;
      while playing back the media content, and after a loss of power from the power supply:
         stop playback of the media content; and
      after the loss of power, and after a resumption of power from the power supply:
         automatically determine to rejoin the group and join the playback device to the group.

2. The playback device of claim 1, wherein:
   the loss of power occurs in response to operation of a button or switch, the button or switch being remote from the playback device; and
   the resumption of power occurs in response to operation of the button or switch.

3. The playback device of claim 1, wherein the power supply comprises a battery and the loss of power at the playback device occurs when the battery is depleted.

4. The playback device of claim 1, wherein the instructions, when executed by the processing system, further instruct the playback device to:
   automatically determine to rejoin the group based on a time period between the loss of power and the resumption of power.

5. The playback device of claim 3, wherein the instructions, when executed by the processing system, further instruct the playback device to:
   before the loss of power, monitor a state of charge of the battery and store, in the storage, a current state of charge; and
   automatically determine to rejoin the group based on the current state of charge being less than a threshold.

6. The playback device of claim 1, wherein the instructions, when executed by the processing system, further instruct the playback device to:
   store, in the storage, a current configuration state of the playback device; and
   determine to rejoin the group based on the current configuration state of the playback device.

7. The playback device of claim 1, wherein the power supply comprises a battery and an interface to couple the playback device to an external power source, wherein the loss of power at the playback device comprises a loss of power from the external power source, wherein the resumption of power comprises a resumption of power from the external power source, and wherein the instructions, when executed by the processing system, further instruct the playback device to:
   prior to the loss of power, power the playback device by the external power source;
   after the loss of power:
      power the playback device by the battery; and
   after the resumption of power:
      power the playback device by the external power source.

8. The playback device of claim 1, wherein the playback device is a ceiling speaker.

9. The playback device of claim 1, wherein the instructions, when executed by the processing system, further instruct the playback device to:
   output, using the speaker, an audible alert after the loss of power.

10. A non-transitory computer-readable medium having computer program instructions embodied thereon, wherein the computer program instructions, when executed by a processing system of a playback device, instruct the playback device to:
- play back media content in synchrony with at least a second playback device, wherein the playback device and the second playback devices are playing back the media content as members of a group;
- while playing back the media content, and after a loss of power at the playback device:
  - stop playback of the media content; and
- after the loss of power, and after a resumption of power to the playback device:
  - automatically determine to rejoin the group and join the playback device to the group.

11. A method, comprising:
- playing back, by a first playback device, media content in synchrony with at least a second playback device, wherein the first and second playback devices are playing back the media content as members of a group;
- while playing back the media content, and after a loss of power at the first playback device:
  - stopping, by the first playback device, playback of the media content; and
- after the loss of power, and after a resumption of power to the first playback device:
  - automatically determining to rejoin the group and joining the first playback device to the group.

12. The method of claim 11, wherein:
- the loss of power occurs after an operation of a button or switch, the button or switch being remote from the first playback device; and
- the resumption of power occurs after a subsequent operation of the button or switch.

13. The method of claim 11, wherein the first playback device comprises a battery and the loss of power at the first playback device occurs when the battery is depleted.

14. The method of claim 11, wherein automatically determining to rejoin the group comprises automatically determining to rejoin the group based on a time period between the loss of power and the resumption of power.

15. The method of claim 14, wherein the time period is less than about 5 minutes.

16. The method of claim 13, further comprising:
- before the loss of power, monitoring a state of charge of the battery and storing a current state of charge;
- wherein automatically determining to rejoin the group comprises:
  - determining to rejoin the group based on the current state of charge being less than a threshold.

17. The method of claim 11, wherein automatically determining to rejoin the group comprises:
- storing a configuration state of the first playback device; and
- determining to rejoin the group based on the configuration state of the first playback device.

18. The method of claim 11, wherein the first playback device comprises a battery and is further electrically couplable to an external power source, wherein the loss of power at the first playback device comprises loss of power from the external power source and wherein the resumption of power comprises resumption of power from the external power source, the method further comprising:
- prior to the loss of power, powering the first playback device by the external power source;
- after the loss of power:
  - powering the first playback device by the battery; and
- after the resumption of power:
  - powering the first playback device by the external power source.

19. The method of claim 11, further comprising:
- after the loss of power:
  - outputting, by the first playback device, an audible alert.

20. The method of claim 11, further comprising, after joining the first playback device to the group:
- determining, by the first playback device, that the members of the group are currently playing back media content; and
- playing back, by the first playback device, the media content in synchrony with at least the second playback device.

* * * * *